US011272761B2

(12) United States Patent
Bertagna et al.

(10) Patent No.: US 11,272,761 B2
(45) Date of Patent: *Mar. 15, 2022

(54) SYSTEM AND METHOD FOR EMBEDDING A TRACKING DEVICE IN A FOOTWEAR INSOLE

(71) Applicant: GTX Corp., Los Angeles, CA (US)

(72) Inventors: Patrick E. Bertagna, Los Angeles, CA (US); Andrew Hamish Duncan, Los Angeles, CA (US); Li Wang, Valley Village, CA (US); Adam Solis, Long Beach, CA (US)

(73) Assignee: GTX Corp, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,599

(22) Filed: Jul. 10, 2020

(65) Prior Publication Data
US 2020/0405010 A1 Dec. 31, 2020

Related U.S. Application Data

(63) Continuation of application No. 16/369,935, filed on Mar. 29, 2019, now Pat. No. 10,743,615, which is a continuation of application No. 15/858,881, filed on Dec. 29, 2017, now Pat. No. 10,292,453, which is a continuation of application No. 14/120,374, filed on May 14, 2014, now Pat. No. 9,854,872.

(60) Provisional application No. 61/897,485, filed on Oct. 30, 2013, provisional application No. 61/823,062, filed on May 14, 2013.

(51) Int. Cl.
A43B 17/00 (2006.01)
A43B 13/38 (2006.01)
G01S 19/14 (2010.01)
G01S 19/48 (2010.01)
A43B 3/00 (2022.01)
G08B 21/02 (2006.01)

(52) U.S. Cl.
CPC ............ *A43B 13/38* (2013.01); *A43B 3/0005* (2013.01); *A43B 17/00* (2013.01); *G01S 19/14* (2013.01); *G01S 19/48* (2013.01); *G08B 21/023* (2013.01); *G08B 21/0261* (2013.01); *G08B 21/0288* (2013.01); *G08B 21/0291* (2013.01); *G08B 21/0269* (2013.01)

(58) Field of Classification Search
None
See application file for complete search history.

(56) References Cited

U.S. PATENT DOCUMENTS 5,921,653 A * 7/1999 Chien .................. A43B 1/0036
362/103
6,156,028 A * 12/2000 Prescott ............... A61N 5/0616
606/2

(Continued)

*Primary Examiner* — John F Mortell
(74) *Attorney, Agent, or Firm* — Larry E. Henneman, Jr.; Henneman & Associates, PLC

(57) ABSTRACT

A novel tracking system is disclosed. In one embodiment, a long-range tracking device is incorporated into a removable footwear insole and a short-range tracking device is incorporated into another removable footwear insole. The long-range tracking device includes a location determining device, a wireless communication device, and a power source. In a more particular embodiment, the location determining device is a GPS receiver, and the communication device is a cellular modem.

20 Claims, 27 Drawing Sheets

(56) References Cited

U.S. PATENT DOCUMENTS

| | | | | |
|---|---|---|---|---|
| 7,002,217 | B2 * | 2/2006 | Hollingsworth | H01L 23/552 257/355 |
| 2006/0261950 | A1 * | 11/2006 | Arneson | G06K 19/0723 340/572.1 |
| 2008/0220320 | A1 * | 9/2008 | Horikoshi | H01M 50/579 429/82 |
| 2008/0268346 | A1 * | 10/2008 | Inda | H01M 10/0525 429/322 |
| 2010/0033321 | A1 * | 2/2010 | Kaminski | A43B 3/0005 340/539.13 |
| 2011/0260857 | A1 * | 10/2011 | Hamill | A43B 3/0005 340/539.13 |
| 2011/0296710 | A1 * | 12/2011 | Holzer | A43B 17/00 36/43 |
| 2012/0023785 | A1 * | 2/2012 | Barnes | A43B 7/143 36/141 |
| 2014/0266571 | A1 * | 9/2014 | Sharma | G09B 21/003 340/4.12 |
| 2015/0048942 | A1 * | 2/2015 | Bertagna | A43B 3/0005 340/539.13 |

\* cited by examiner

SYSTEM AND METHOD FOR EMBEDDING A TRACKING DEVICE IN A FOOTWEAR INSOLE

RELATED APPLICATIONS

This application is a continuation of co-pending U.S. patent application Ser. No. 16/369,935, filed on Mar. 29, 2019 by the same inventors, which is a continuation of U.S. patent application Ser. No. 15/858,881 (now U.S. Pat. No. 10,292,453), filed Dec. 29, 2017 by the same inventors, which is a continuation of U.S. patent application Ser. No. 14/120,374 (now U.S. Pat. No. 9,854,872) entitled "System And Method For Embedding A Tracking Device In A Footwear Insole," filed May 14, 2014 by the same inventors, which claims the benefit of U.S. Provisional Patent Application Ser. No. 61/823,062 entitled "System And Method For Embedding A Tracking Device In A Footwear Insole," filed May 14, 2013 by at least one common inventor, and U.S. Provisional Patent Application Ser. No. 61/897,485 entitled "Footwear With Removable Tracking Unit," filed Oct. 30, 2013 by at least one common inventor, all of which are incorporated herein by reference in their respective entireties.

BACKGROUND OF THE INVENTION

Field of the Invention

This invention relates generally to personal tracking devices, and more particularly to personal tracking devices incorporated into footwear.

Description of the Background Art

Personal tracking devices are known in the art. One possibly desirable means of carrying a personal tracking device is to incorporate the personal tracking device into footwear. However, there are many obstacles to incorporating personal tracking devices into footwear, while maintaining the comfort, appearance, and affordability of the footwear.

Previously, this has been accomplished with footwear that is specially designed to receive a tracking system. For example, some footwear has been designed with special cavities formed in the sole so as to provide a place to conceal a GPS device.

There are problems associated with such footwear. For example, users have a limited selection of footwear styles. That is, users are limited to only those styles made available by the tracking system footwear manufacturer. Of course, such footwear is also likely to be more expensive than conventional footwear. In addition, most people have several pairs of shoes/footwear for different occasions. Having several pairs of GPS enabled footwear would be cost-prohibitive for many potential users.

Another problem with tracking devices that use satellite signals is that the tracking devices can be nonfunctional in certain areas (e.g., inside of buildings) where the satellite signals cannot be received. In addition, the battery life of the tracking device can be diminished if the device is constantly searching for a signal or otherwise operating when not needed.

What is needed, therefore, is a tracking system that can be incorporated into footwear that is not specifically designed to receive tracking devices. What is also needed is a tracking device that can be easily transferred from one pair of footwear to another. What is also needed is a tracking device that can be used interchangeably with multiple different pairs of footwear. What is also needed is a tracking device that operates satisfactorily when worn indoors for extended periods of time.

SUMMARY

The present invention overcomes the problems associated with the prior art by providing a tracking device that can be easily transferred between different pairs of footwear. The present invention also overcomes the problems associated with the prior art by providing a tracking device that includes a long-range tracking device and a short-range tracking device. The invention facilitates tracking a wearer within a predefined space (e.g., a patient care facility) using the short-range tracking device, and tracking the wearer with the long-range tracking device when the wearer leaves the predefined space. In an example embodiment, the tracking device is contained within a pair of removable footwear insoles, with the short-range tracking device disposed in one of the insoles and the long-range tracking device disposed within the other of the insoles.

An example footwear insole tracking system includes a first insole body and a first tracking device. The first insole body is configured for removable insertion into footwear and configured to engage the plantar region of a foot of a wearer. The first tracking device is disposed at least partially within the first insole body.

The first tracking device includes a location determining device, a wireless communication device, and a power source. The location determining device is electrically coupled to the wireless communication device, and both location determining device and the wireless communication device are electrically coupled to the power source (e.g., via a modular connector).

In the example embodiment, the power source is a battery. In an example embodiment, the battery is a lithium polymer battery. Alternatively, the battery can be a flexible lithium ceramic battery. Optionally, the power source can include an electricity generator.

Several alternative means for charging the battery are disclosed. According to one alternative, the footwear insole tracking system additionally includes an inductance charging element disposed at least partially within the first insole body and being electrically coupled to the battery. In another embodiment, the footwear insole tracking system includes a wired electronic communication port electrically coupled to the first tracking device, being disposed at least partially within the first insole body, and being accessible from outside the first insole body. In yet another embodiment, the footwear insole tracking system includes a set of wires electrically coupled to the first tracking device and extending from the first insole body.

Several means for relieving stress on the wires are disclosed. In one embodiment, the set of wires is coiled to facilitate flexing. In another embodiment, the first tracking device includes a circuit board. The location determining device and the wireless communication device are coupled to the circuit board, and the set of wires is wrapped around the circuit board. In yet another embodiment, the set of wires is arranged in a generally zig-zagged shape.

Means for protecting the battery from damage and for protecting the wearer from the battery are provided in the insole. For example, one embodiment includes an optional fire-proof enclosure disposed within the first insole body and surrounding the battery. As another option, the footwear insole tracking system can include a rigid plate disposed at least partially in the first insole body. The battery is then positioned above the rigid plate to protect the battery against puncture if, for example, the wearer steps on a nail that punctures the bottom of the footwear.

Means for protecting the tracking device from the process of being incorporated into a footwear insole are also disclosed. For example, at least one of the location determining device and the wireless communication device is at least partially encapsulated in epoxy. As another option, the footwear insole tracking system can include a rigid housing disposed at least partially in the first insole body and covering at least a portion of the first tracking device. In an example embodiment, the rigid housing is an enclosed receptacle, and the location determining device and the wireless communication device are substantially enclosed within the receptacle.

In an example embodiment, the first tracking device is a long-range tracking device. The location determining device is a global positioning system signal receiver, and the wireless communication device is a cell phone modem, which includes a global system for mobile communication antenna. The footwear insole tracking system additionally includes a subscriber identification module card coupled to the wireless communication device and disposed at least partially in the first insole body. One or both of the location determining device and the wireless communication device include a flexible patch antenna disposed within the insole body. Optionally, at least one of the location determining device and the wireless communication device includes an antenna mounted directly on a circuit board.

In an example embodiment, the location determining device includes a global positioning system antenna (GPS) mounted on a circuit board, and the location determining device and the wireless communication device are mounted on the same circuit board. The GPS antenna is located on one side of the circuit board, and a processing unit of the first tracking device is located on an opposite side of the circuit board. The subscriber identification module card of the first tracking device is also located on the opposite side of the circuit board.

Alternate means for mounting a tracking device or any other type of device within a removable footwear insole are also disclosed. The mounting means include an electronic device receptacle disposed at least partially in the insole body and accessible from outside the insole body. The electronic device receptacle is configured to receive the first tracking device and/or any other type of device configured to fit within the receptacle. The insole body is formed around the receptacle by, for example, molding the insole body around the first tracking device.

In an example embodiment, the first insole body is formed from polyurethane material. Optionally, the first tracking device is fully encapsulated within the first insole body.

Alternatively, the first tracking device can be a short-range tracking device detectable within a limited space by a local tracking system.

Either embodiment (the first tracking device is a short-range tracking device or the first tracking device is a long range tracking device) provides, individually, important advantages over the devices of the prior art. However, when both embodiments are used in combination, an important synergy and even greater advantages over the prior art are achieved.

In an example combined embodiment, the first tracking device is a short-range tracking device detectable within a limited space by a local tracking system. The footwear insole tracking system additionally includes a second insole body configured for removable insertion into footwear and configured to engage the plantar region of an opposite foot of the wearer, with respect to the first insole body. A long-range tracking device is disposed at least partially within the second insole body and is trackable outside the limited space by a long-range tracking system. The long-range tracking device includes a location determining device, a wireless communication device electrically coupled to the location determining device, and a power source electrically coupled to the location determining device and the wireless communication device.

A method of tracking an object is also disclosed. The method includes attaching a short-range tracking device to the object and attaching a long-range tracking device to the object. The method additionally includes determining when the object has left a predefined area using the short-range tracking device, and activating the long-range tracking device when it is determined that the object has left the predefined area. The method continues by tracking the object outside the predefined are with the long-range tracking device.

A footwear insole device hosting platform is also disclosed. The footwear insole includes an insole body configured for removable insertion into footwear and configured to engage the plantar region of a foot. The footwear insole additionally includes an electronic device receptacle disposed within the insole body and configured to selectively receive an electronic device from outside the insole body. The electronic device receptacle is configured to retain and house the electronic device during use of the insole, and to selectively release the electronic device to facilitate removal and replacement of the electronic device.

A method of manufacturing a tracking device is also disclosed. The method includes providing a first tracking device and disposing the first tracking device in a first removable footwear insole. In an example method, the first tracking device is either a short-range tracking device or a long-range tracking device. The method optionally includes the additional steps of providing a second tracking device, and disposing the second tracking device in a second removable footwear insole. One of the first removable footwear insole and the second removable footwear insole are configured for a right foot, and the other of the first removable footwear insole and the second removable footwear insole are configured for a left foot. Additionally, one of the first tracking device and the second tracking device is a short-range tracking device, and the other of the first tracking device and the second tracking device is a long-range tracking device.

BRIEF DESCRIPTION OF THE DRAWINGS

The present invention is described with reference to the following drawings, wherein like reference numbers denote substantially similar elements.

DETAILED DESCRIPTION

The present invention overcomes problems associated with the prior art, by providing a footwear insole with an embedded tracking device. The present invention also overcomes problems associated with the prior art, by providing a tracking device that includes a long-range tracking device and a short-range tracking device. In the following description, numerous specific details are set forth (e.g., particular electronic components) in order to provide a thorough understanding of the invention. Those skilled in the art will recognize, however, that the invention may be practiced apart from these specific details. In other instances, details of well-known footwear insole manufacturing and electronics assembly practices and components have been omitted, so as not to unnecessarily obscure the present invention.

Figure 1:
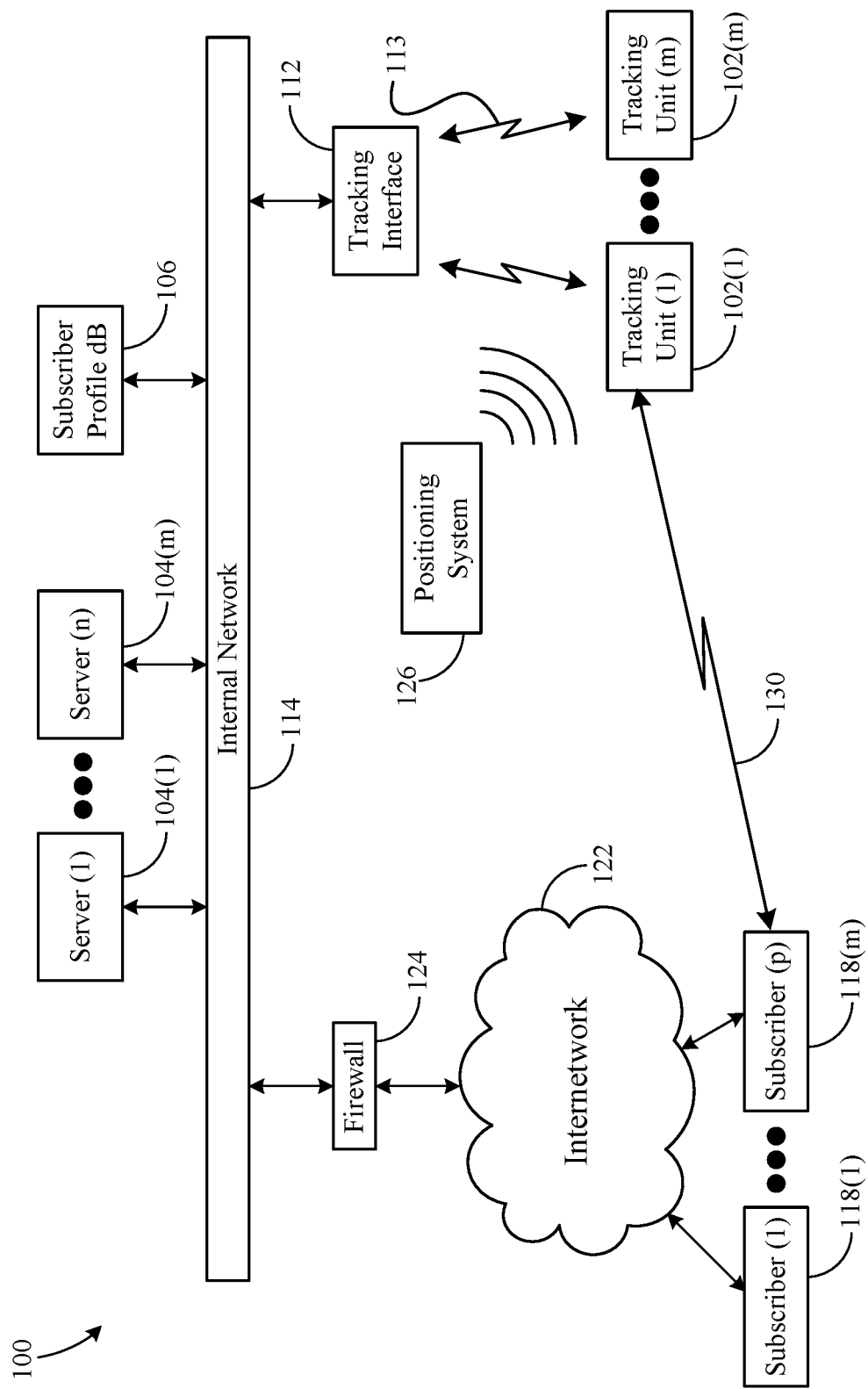
FIG. 1 is a block diagram of a system for tracking and/or monitoring one or more tracking units.

FIG. 1 is a block diagram of a system 100 for tracking and/or monitoring one or more tracking units 102(1-$m$) and for providing customized augmented location data to each of a plurality of subscribers 118 (1-$p$) associated with the tracking units 102(1-$m$). System 100 includes a plurality of tracking units 102(1-$m$), one or more servers 104(1-$n$), a subscriber profile database 106, and a tracking interface 112, all intercommunicating via an internal network 114. System 100 also includes one or more subscribers systems 118(1-$p$), which communicate with an internetwork 122 (e.g., the Internet). Internal network 114 is also connected to internetwork 122 through a firewall 124, which provides a measure of security for internal network 114 against incoming threats from internetwork 122. As will later be described in further detail, each tracking unit 102 is adapted to be disposed in footwear such that the wearer can be tracked by one or more of subscribers 118.

The elements of tracking system 100 provide the following general functions. Tracking units 102(1-$m$) provide geographical location data (e.g., latitude and longitude coordinates, etc.) indicating their geographical locations to servers 104(1-$n$) via tracking interface 112. In addition, tracking units 102(1-$m$) can also be tracked by a local subscriber tracking system, as will be explained in greater detail below. Servers 104(1-$n$) perform tracking services for subscribers using subscriber systems 118(1-$p$) and augment location data received from tracking units 102(1-$m$) so that the subscribers using subscriber systems 118 (1-$p$) can track and/or monitor their associated tracking unit(s) 102(1-$m$) in a customized, augmented manner. Subscriber profile database 106 stores information, including customized augmentation preferences, associated with each subscriber. Servers 104(1-$n$) augment and transmit location data to subscribers using subscriber systems 118(1-$p$). Tracking interface 112 receives data and commands from servers 104(1-$n$) (e.g., location request signals, control routines, etc.) and transmits the data and commands to the destination tracking unit 102(1-$m$). Tracking interface 112 also receives data (e.g., location data, bio-metric sensor readings, alert signals, etc.) from tracking units 102(1-$m$) and provides the received data to one or more servers 104(1-$n$). In the present embodiment, tracking interface 112 interfaces with tracking units 102(1-$m$) wirelessly, for example via a wireless communication link 113. Indeed, wireless communication link 113 represents any means of wireless communication, now known or yet to be discovered, that facilitates communication between footwear insole 102 and subscriber server 104 including, but not limited to cellular networks (e.g., CDMA and GSM), satellite networks, WIFI networks, and radio communication.

Responsive to a command from subscriber server 104, tracking unit 102 determines its location using location signals received from a positioning system 126 and transmits data indicative of the determined position back to subscriber server 104. Positioning system 126 represents any type of satellite or terrestrial based positioning system that transmits signals that can be used to determine location. For example, a global positioning system (GPS) currently in use employs a plurality of satellites that continuously transmit signals. GPS receivers can calculate location by determining the difference in the time of receipt of signals from different satellites. GPS technology is well known, and so will not be described in detail herein.

As an alternative to a GPS type system, positioning system 126 can be incorporated into wireless communication link 113. For example, wireless telephone networks now have the capability of determining the location of mobile telephone handsets based on signals from a plurality of signal towers in the network. Wireless communication link 113 can then provide the determined location directly to tracking unit 102, which in turn can communicate the location to subscriber server 104. As a result, positioning system 126 can be thought of as either optional or as being incorporated into wireless communication link 113.

Subscriber systems 118(1-*p*) are human users and/or electronic devices that allow the human subscriber/user (e.g., a person with an interest in the location of the person wearing tracking unit 102) to electronically interact with servers 104(1-*n*) to define data augmentation preferences and to obtain customized augmented location data and alerts from their associated tracking units(s) 102. For instance, when a user initially subscribes to the tracking system 100, the subscriber optionally sets up a username and password with one of servers 104 via a subscriber system 118. That particular server 104 would also create a subscriber profile uniquely associated with that subscriber and then allow the subscriber (again via subscriber system 118) to customize what augmentation routines the subscriber would like use to augment the location data received from his tracking unit 102. Server 104 then stores the subscriber's profile in subscriber database 106. In addition, if a subscriber registers more than one tracking units 102 with system 100, then a separate subscriber profile can be created in subscriber profile database 106 for each tracking unit 102 associated with the subscriber. Alternatively, multiple tracking units 102 can be associated with a single subscriber profile in database 106, for example, where the subscriber wishes to run the same augmentation routines on the location data provided by each associated tracking unit 102. The subscriber profiles in database 106 also contain any other pertinent information associated with a subscriber such as personal information (address, telephone number, etc.), payment information such as a credit card number, a network identifier uniquely identifying the subscriber 118 on the network 122, etc. Subscribers 118(1-*p*) represent individuals with an interest in the location of the person wearing tracking unit 102. For example tracking system 100 can be used by parents to locate children, by service departments to locate emergency service personal in the field, and so on.

Generally, a server 104 operates as follows to provide customized augmented location data to a subscriber using a subscriber system 118. Server 104, upon receiving the location data from a tracking unit 102, associates the location data with a particular subscriber, augments the location according to one or more of a plurality of predetermined routines based on information associated with the subscriber, and then presents the augmented location data to the subscriber via internetwork 122 and an associated subscriber system 118. Note that the predetermined augmentation routines can be defined in the subscriber's profile stored in subscriber profile database 106, or could have been input manually by the subscriber via subscriber system 118 before the location data was augmented.

It should be noted that the present embodiment is described with respect to "subscribers" using subscriber systems 118, implying that the subscribers pay for the services provided by tracking system 100. For example, subscription services offered for a subscriber's use of system 100 could vary by price based on any number of criteria such as the complexity of the augmented location data provided, the number of augmentation routines employed by the subscriber, the augmented location data delivery method, the number of tracking units 102 associated with a subscriber, and so on. However, tracking system 100 is not limited to a subscription type business model. For example, access to system 100 could be provided to the subscribers for free, and system 100 could rely on some other business model to raise revenue.

Tracking units 102(1-*m*) optionally include software and/or firmware that facilitates communication directly with one or more of subscribers 118(1-*p*) via a telecommunications carrier 130.

Figure 2:
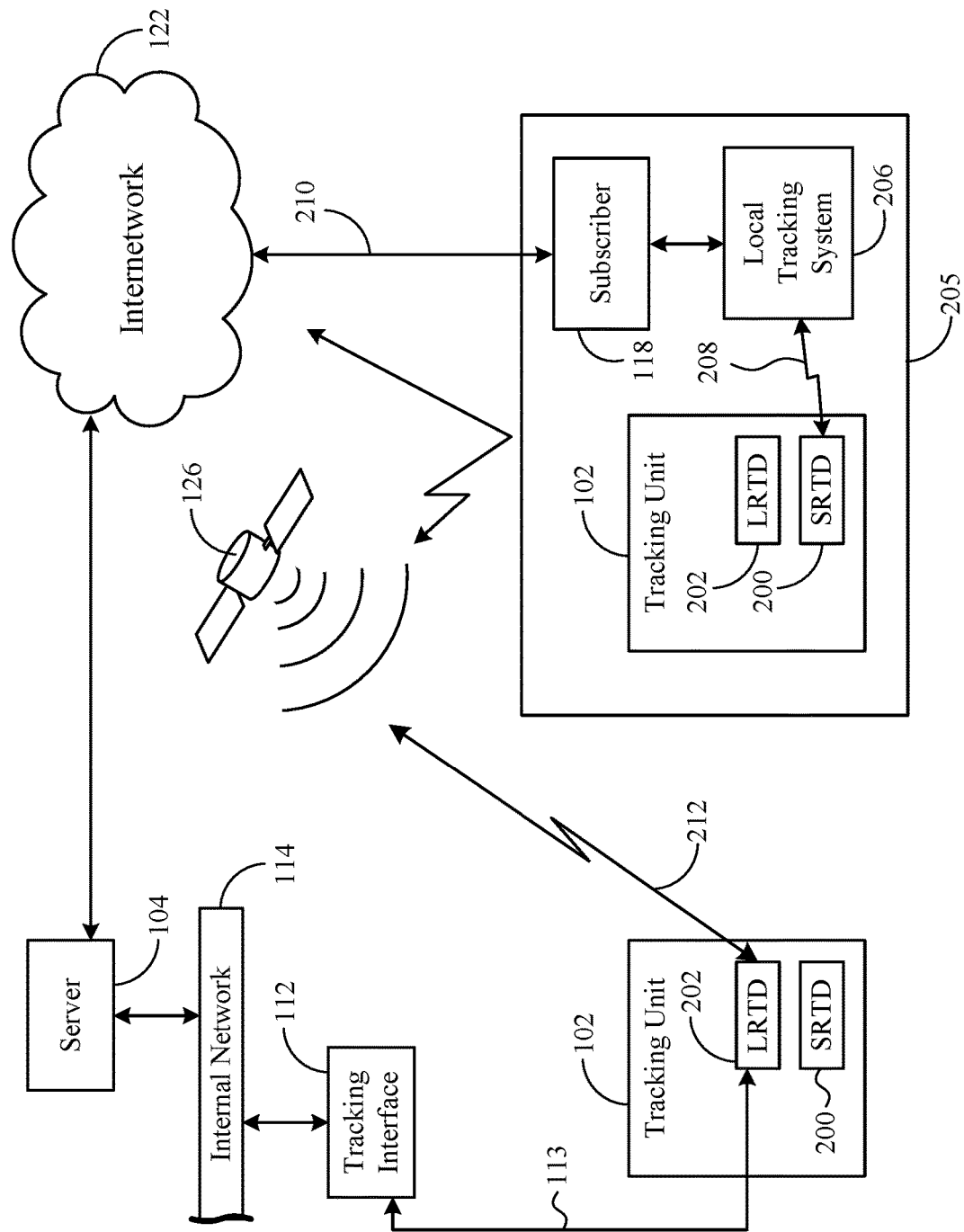
FIG. 2 is a block diagram showing the tracking unit of FIG. 1 in greater detail.

FIG. 2 is a block diagram showing tracking unit 102 in greater detail to include a short-range tracking device (SRDT) 200 and a long-range tracking device (LRTD) 202. In addition, one subscriber system 118 is shown to be included in a facility 205 (e.g., a hospital, long term care unit, etc.) along with a local tracking system 206. SRTD 200 includes, for example, a radio frequency identification (RFID) device that enables tracking unit 102 to be tracked in locations where satellite signals cannot be detected by LRTD 202 and/or where battery life of the tracking unit is a consideration. As another option, SRTD 200 can include a BLUETOOTH® low energy (BLE) device. Indeed, SRTD 200 can be any device capable of being tracked locally.

In this example, tracking unit 102 is being worn by a patient in facility 205. When tracking unit 102 is within the perimeters of facility 205, SRTD 200 communicates location data to (or is simply detectable by) local tracking system 206 via a wireless link 208, while LRTD 202 remains inactive. If the patient wearing tracking unit 102 leaves the perimeter of facility 205, LRTD 202 is activated and SRTD 200 is optionally deactivated. There are many ways to detect that tracking unit 102 is beyond the perimeters of facility 205. For example, local tracking system 206 could lose communication with SRTD 200. Optionally, local tracking system 206 could detect that tracking unit 102 has exceeded the allowable range (or no longer be able to detect tracking unit 102). As yet another option, local tracking system 206 can detect SRTD 200 passing an unauthorized point (e.g., out a door of facility 205). Whatever type of SRTD is used, once local tracking system 206 determines that SRTD 200 has left facility 205, local tracking system 206 notifies subscriber system 118, which communicates an alert to server 104 through a link 210. Once the alert is received, server 104 sends tracking unit 102 a communication, via tracking interface 112, instructing tracking unit 102 to activate LRTD 202 and (optionally) deactivate SRTD 200. As another option, in embodiments where SRTD 200 is able to detect that it is out of range, SRTD 200 can activate LRTD 202. When activated, LRTD 202 receives wireless signals 212 from positioning system 126, calculates location data, and relays the current location to server 104 via tracking interface 112 and wireless communication link 113. Then, server 104 can communicate the location of LRTD to subscriber 118 and/or other emergency personnel.

If tracking unit 102 enters back into the perimeters defined by local tracking system 206, wireless link 208 (or mere detection) can be reestablished. Once it is determined that SRTD 200 is back in facility 205, LRTD 202 can be deactivated and STRD 200 can be reactivated (in embodiments where STRD 200 is an active device).

Figure 3:
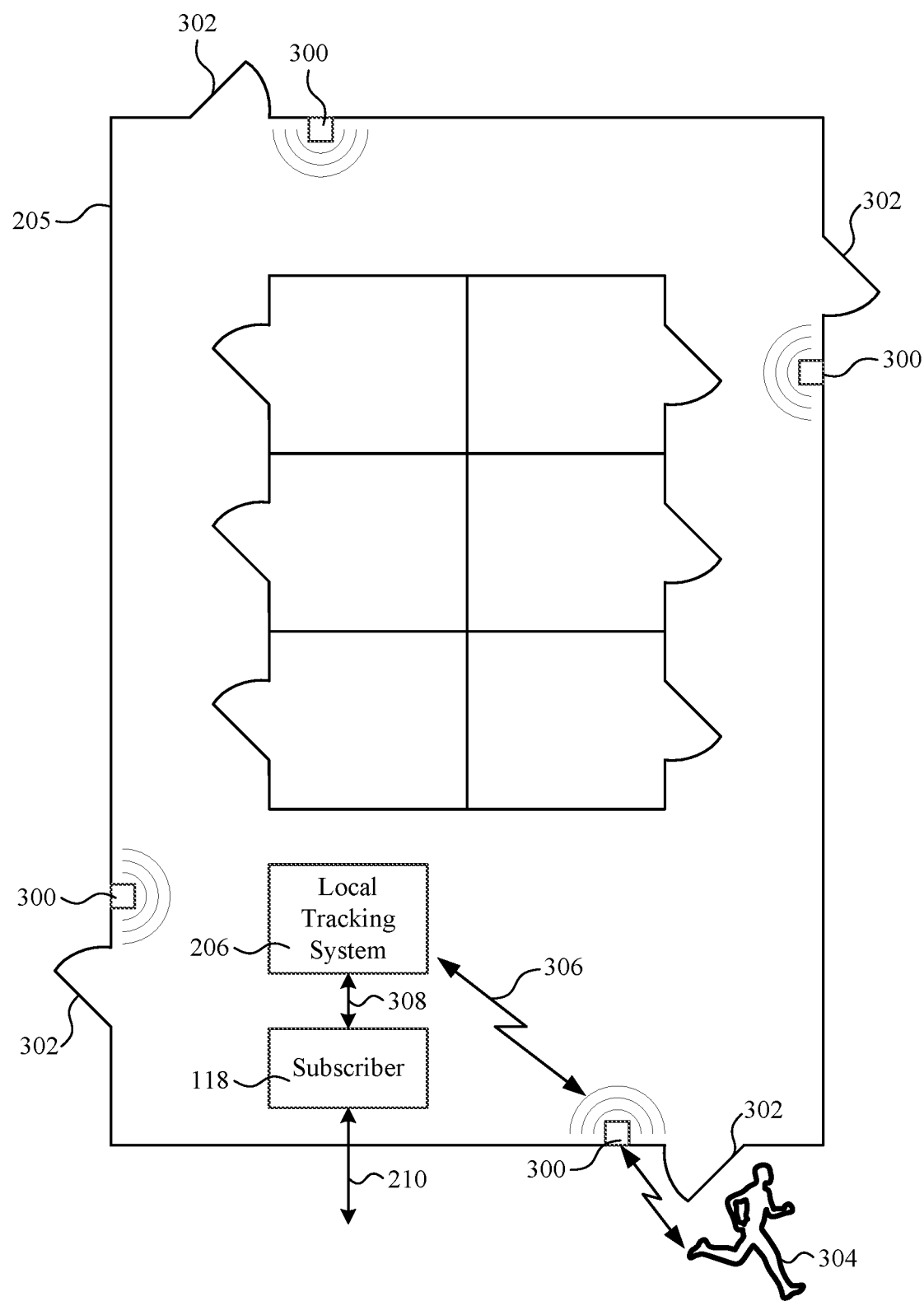
FIG. 3 is a representational floor plan of care facility employing the tracking system of FIG. 2.

FIG. 3 is a representational floor plan of care facility 205. In this particular embodiment, a beacon 300 is positioned near each exit 302 of facility 205 to detect when a wearer 304 of SRTD 200 is beyond some predetermined perimeter. If wearer 304 moves near beacon 300, local tracking system 206 is alerted via a wireless link 306. Local tracking system 206 then alerts subscriber 118 via a link 308. Subscriber 118 then notifies server 104 via communication link 210, so that server 104 can take appropriate actions such as, for example, activating LRTD 202. Once activated, server 104 can request and receive the current position of LRTD 202, and communicate that position to subscriber 118 and/or emergency responders.

Figure 4:
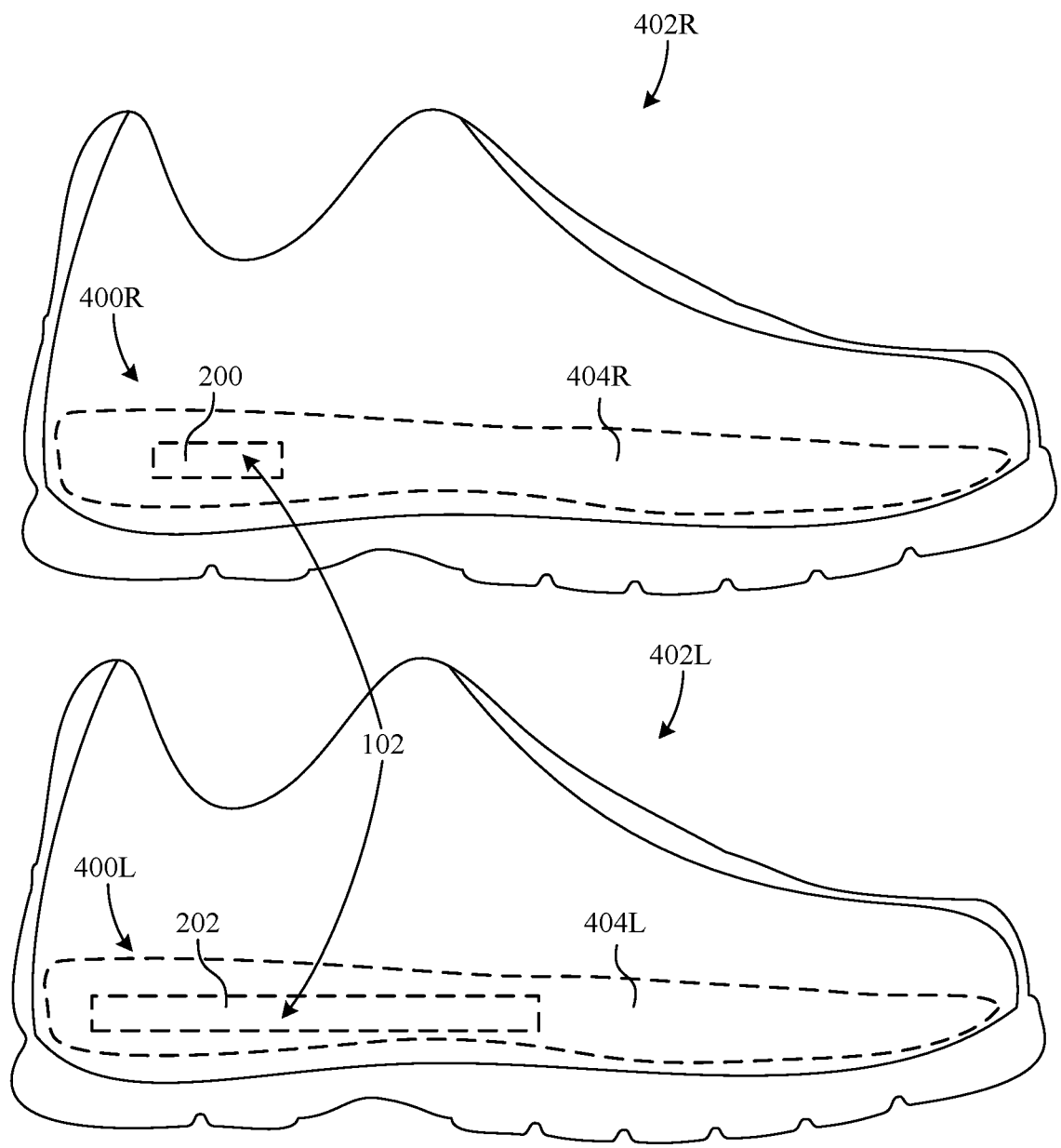
FIG. 4 is a side view of footwear having insoles with embedded tracking units.

FIG. 4 shows an example of tracking unit 102 embodied in a pair of removable footwear insoles 400R and 400L, configured for insertion into a right shoe 402R and left shoe 402L, respectively. Insole 400L includes LRTD 202 embedded within an insole body 404L, and insole 400R includes SRTD 200 embedded within another insole body 404R. Insoles 400R and 400L are intended to be used in combination as a pair. However, a user could elect to use either insole 400R or 400L alone, and still achieve the benefits provided by the respective insole. For example, a user interested only in long range, outdoor tracking could use insole 400L, without insole 400R. Conversely, a user interested only in tracking within a facility could use insole 400R, without insole 400L. In such cases, an insole without any tracking device can be used in the opposite shoe to maintain a consistent feel for the wearer. Of course, it does not matter into which insole (right or left) a particular tracking device (SRTD 200 of LRTD 202) is incorporated.

The removability of footwear insoles 400L and 400R from shoes 402L and 402R, respectively, allow footwear insoles 400L and 400R to be used in any other shoes that a wearer owns, even if those shoes are not necessarily designed for tracking devices. This is particularly desirable because the consumer is not limited to shoes designed specifically for tracking systems.

Figure 5:
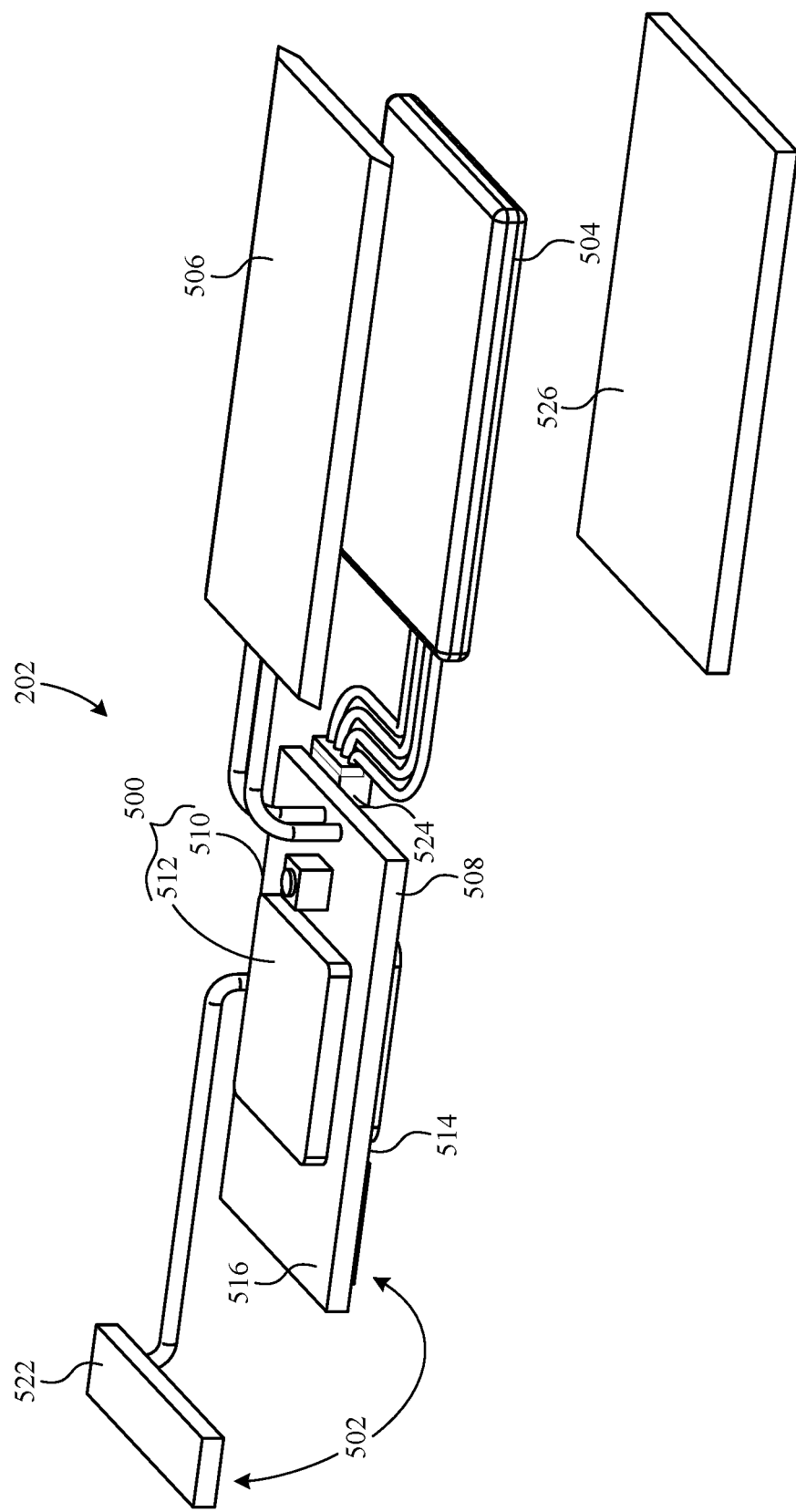
FIG. 5 is a top perspective view of the long-range tracking device of FIG. 2.

FIG. 5 shows a top perspective view of LRTD 202 according to one embodiment of the present invention. LRTD 202 includes a location determining device 500, a wireless communication device 502, a power source 504, and a charging system 506 all coupled to a printed circuit board (PCB) 508.

Location determining device 500 is, for example, a global positioning system (GPS) receiver mounted directly on PCB 508. Location determining device 500 includes a GPS module 510 (shown in FIG. 6) mounted on a bottom surface 514 of PCB 508 and a GPS antenna 512 mounted on a top surface 516 of PCB 508. Module 510 facilitates calculating the position of a user based on the timing of satellite signals received by GPS antenna 512.

Wireless communication device 502 is, for example, a wireless cellular modem that communicates with a wireless cellular network. Wireless communication device 502 includes a subscriber identity module (SIM) card 518, a microprocessor 520, and a global system for mobile communications (GSM) antenna 522, all connected via PCB 508. In particular, SIM card 518 and microprocessor 520 are mounted on bottom surface 514 of PCB 508, and GSM antenna 522 is mounted on top surface 516 of PCB 508.

Power source 504 is a rechargeable lithium polymer battery that provides power to LRTD 202. In the example embodiment, power source 504 is connected to PCB 508 via a wired modular connector 524. The inventors have found that modular connectors are sometimes preferred over direct solder connections because they maintain a reliable electrical connection during the forming of body 404L around LRTD 202. Modular connectors that connect components to PCB 508 are also more robust in maintaining a reliable electrical connection when footwear insole 400L flexes during normal use. As an alternative, power source 504 can be a flexible lithium ceramic battery (FLCB), to eliminate the bulky non-flexible properties inherent in other battery types. In addition, FLCB batteries can be formed into various shapes, thereby making FLCB's desirable for oddly shaped form factors such as insoles. As yet another alternative, power source 504 can be a miniature power generator that harnesses energy from the user's steps. Although not shown in FIG. 5, power source 504 can be disposed in a thin fire-proof bag such as, for example, a liposack. To prevent damage that can occur if a user steps on a sharp object, power source 504 is protected by a protective plate 526. In this example, protective plate 526 is formed, for example, from aluminum, which is relatively strong and light-weight.

Charging system 506 is operative to recharge power source 504. In this particular embodiment, charging system 506 is an inductive charge pad coupled to power source 504 indirectly through PCB 508. The inductive charge pad provides a means for charging power source 504 without the need for a direct conductive electrical connection outside of insole 404L. This is particularly advantageous in that LRTD 202 can be completely embedded in body 404L without any external terminals, thus improving reliability.

Figure 6:
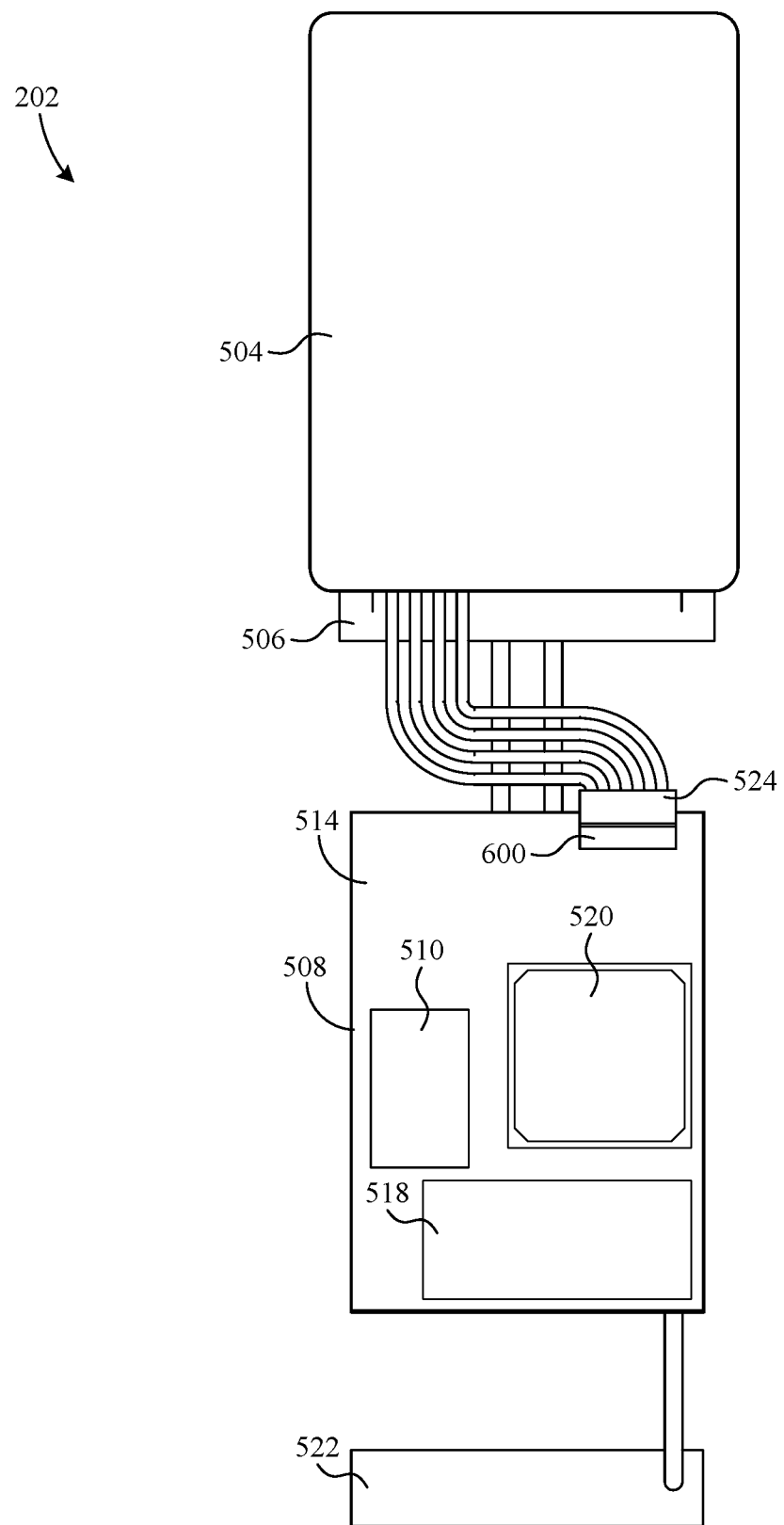
FIG. 6 is a bottom view of the long-range tracking device of FIG. 2.

FIG. 6 shows a bottom view of LRTD 202. In this example, GPS module 510, SIM card 518, a microprocessor 520, and a modular battery connector receiver 600 are mounted on bottom surface 514 of PCB 508. As shown, GSM antenna 522 is positioned at the rear of PCB 508 and power source 504, charging system 506, and plate 526 are positioned in front of PCB 508.

Figure 7:
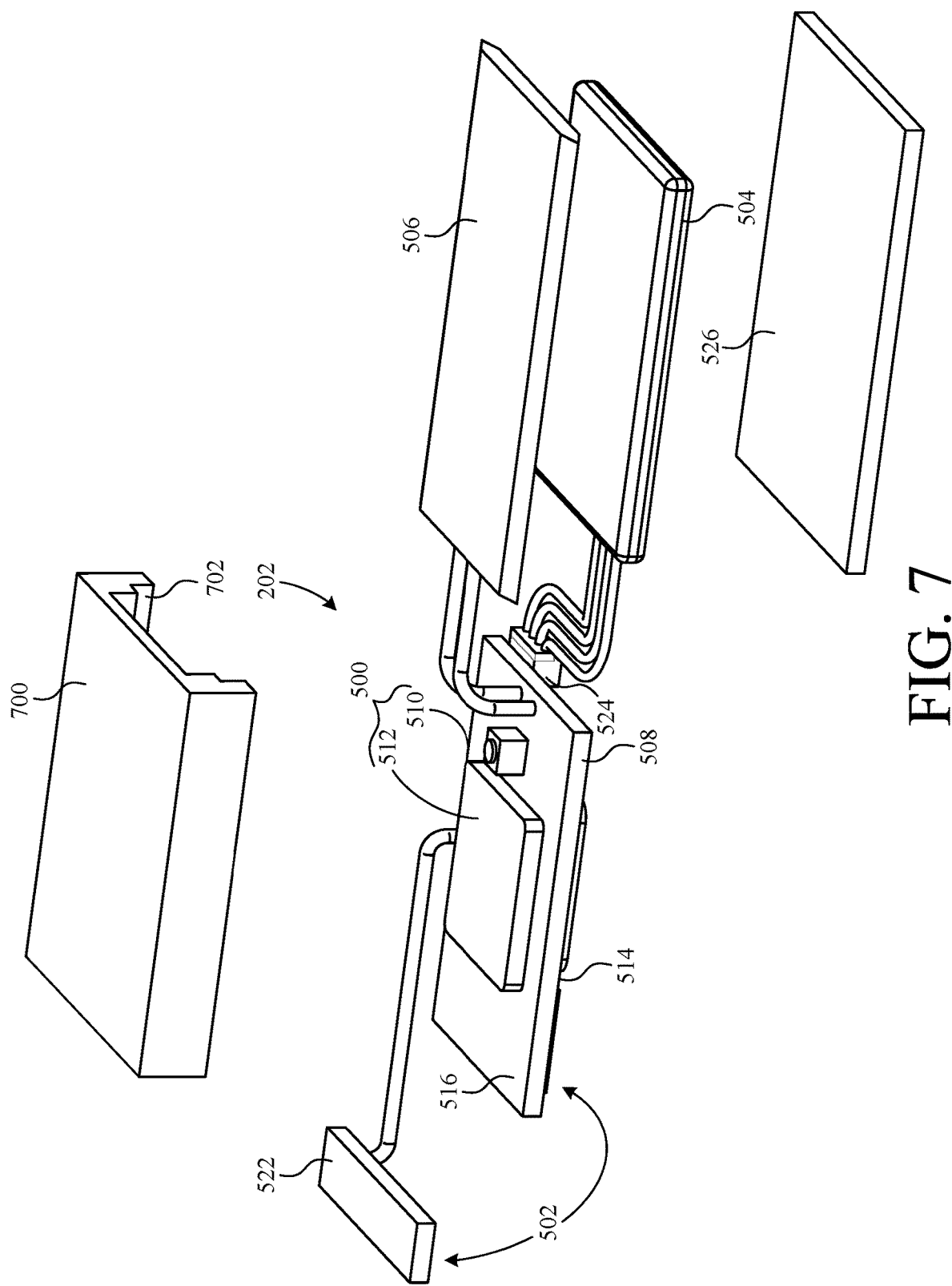
FIG. 7 is a top perspective view of the long-range tracking device of FIG. 2 including a semi-housing structure.

FIG. 7 shows a top perspective view of LRTD 202 with a housing 700 for protecting PCB 508 and components connected thereto from damage. In this example, housing 700 partially encapsulates PCB 508. That is, housing 700 includes a recessed region 702 that receives PCB 508. Housing 700 extends above top surface 516 so as to prevent unwanted pressure from being exerted directly on components and electrical connections. The top of housing 700 forms a bridge over PCB 508 and the components and connection thereon.

Figure 8:
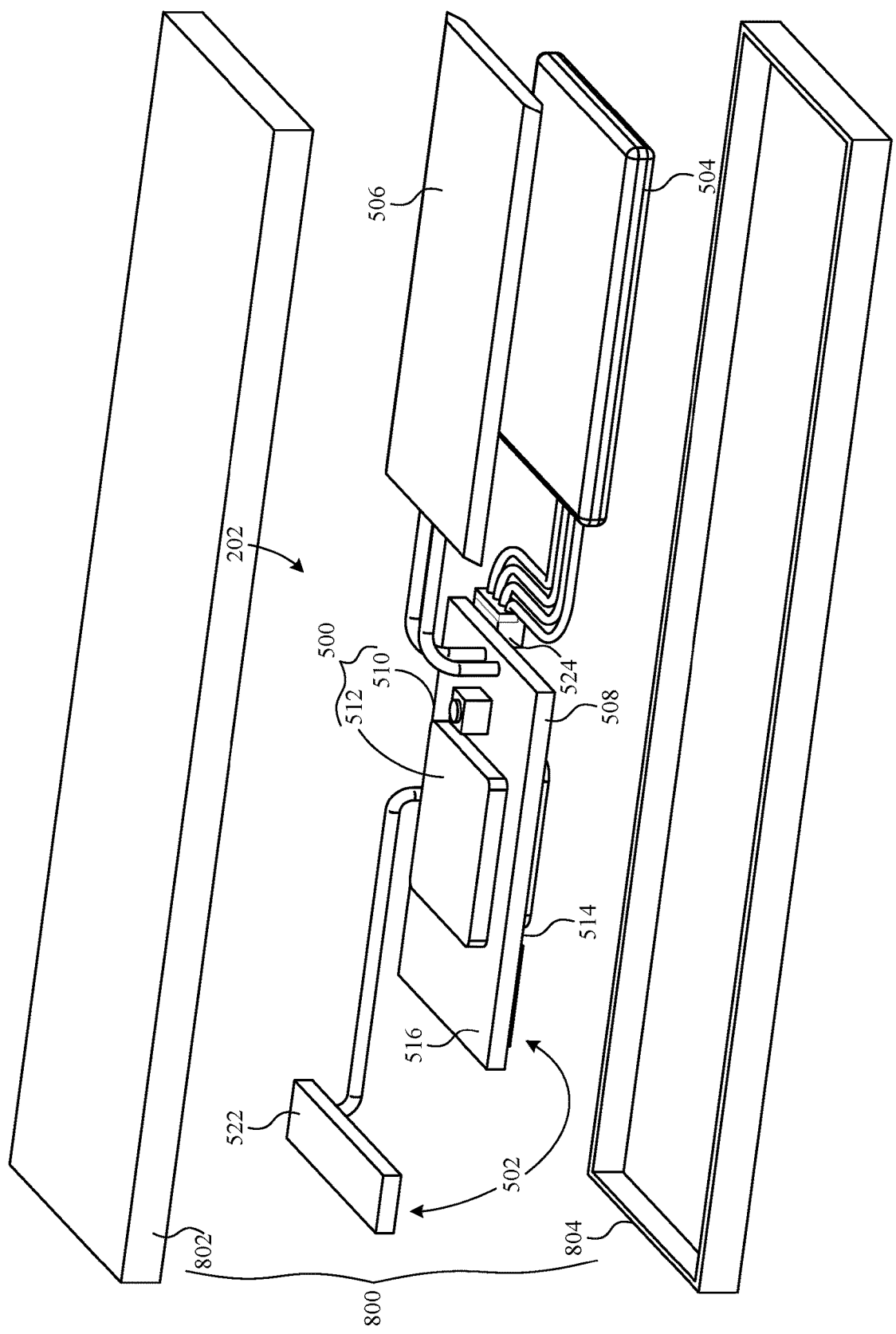
FIG. 8 is a top perspective view of the long-range tracking device of FIG. 2 including a full housing structure.

FIG. 8 shows a top perspective view of LRTD 202 with an alternate housing 800 for protecting tracking device 202 from damage during use. In this example, housing 800 includes a top 802 and a bottom 804 fixed together to completely enclose LRTD 202 therein. This is advantageous, because housing 800 protects LRTD 202 from both mechanical damage and moisture damage. Completely enclosing LRDT 202 also protects LRDT 202 from damage by the material and process of molding LRDT 202 into insole body 404L.

Figure 9:
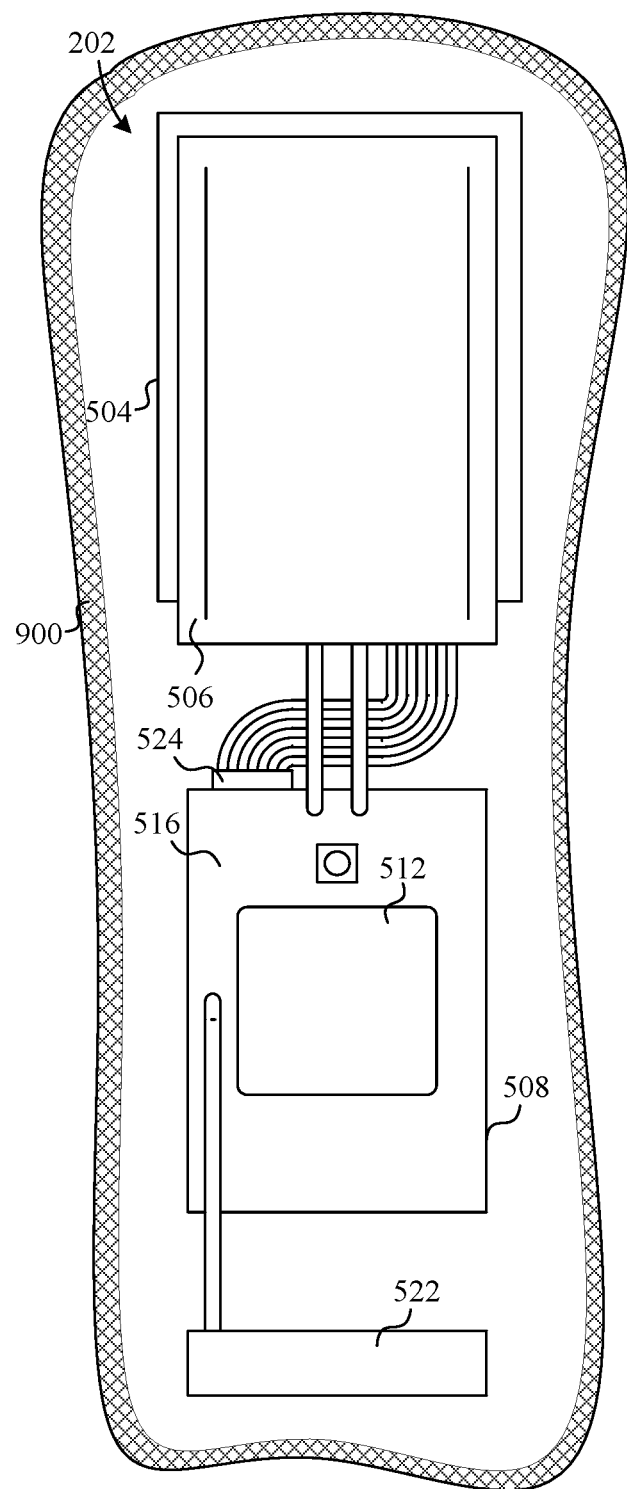
FIG. 9 is a top view of the long-range tracking device of FIG. 2 disposed in a protective substrate.

FIG. 9 shows a top view of LRTD 202 disposed within a protective substrate 900. In the example embodiment, LRTD 202 is vacuum sealed within an antistatic bag 900, to protect LRTD 202 from static electricity and moisture. In addition, bag 900 prevents polyurethane (or other molding material) from entering any cavities on LRTD 202, which can disrupt connections and cause other damage when the polyurethane cures. Bag 900 also facilitates the clean removal of used devices from insole body 404L for reuse and/or refurbishing. Optionally, protective bag 900 can be made from a fire-proof material such as, for example, a liposack.

Figure 10:
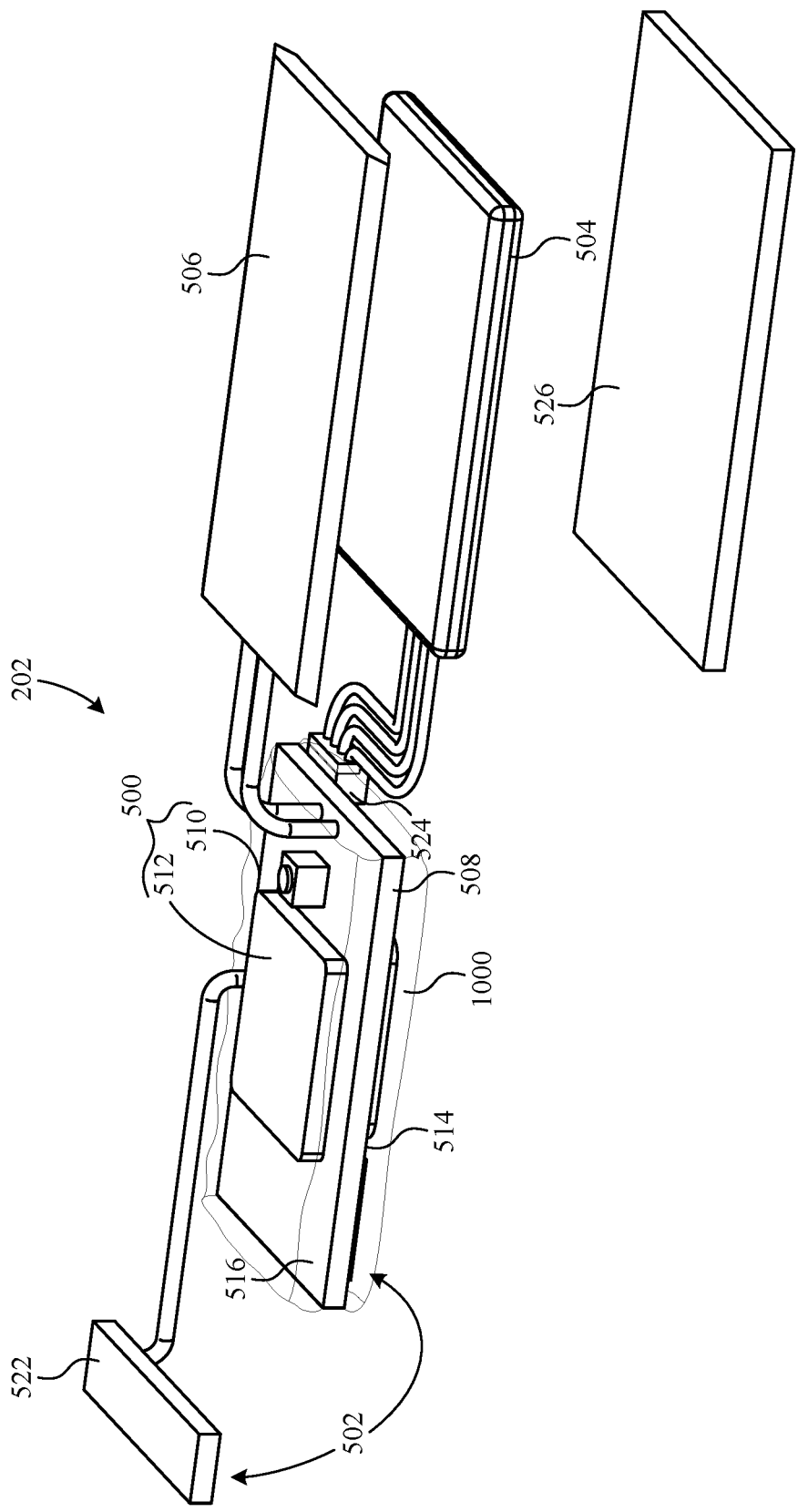
FIG. 10 is a top perspective view of the long-range tracking device of FIG. 2 further including a substrate layer.

FIG. 10 shows a top perspective view of LRTD 202 according to another embodiment of the present invention. In this example, LRTD 202 additionally includes a protective layer 1000 formed around PCB 508 and the components and connectors mounted thereon. Layer 1000 is, for example, an epoxy layer that protects PCB 508 and components mounted thereon from mechanical damage and moisture damage. Layer 1000 also protects the components during the process of forming of body 404L. The inventors have found that when body 404L is formed out of polyurethane, layer 1000 prevents uncured polyurethane from penetrating between PCB 508 and components mounted thereon. This is important because the polyurethane has a tendency to expand when it cures, thereby disconnecting components from PCB 508.

Figure 11:
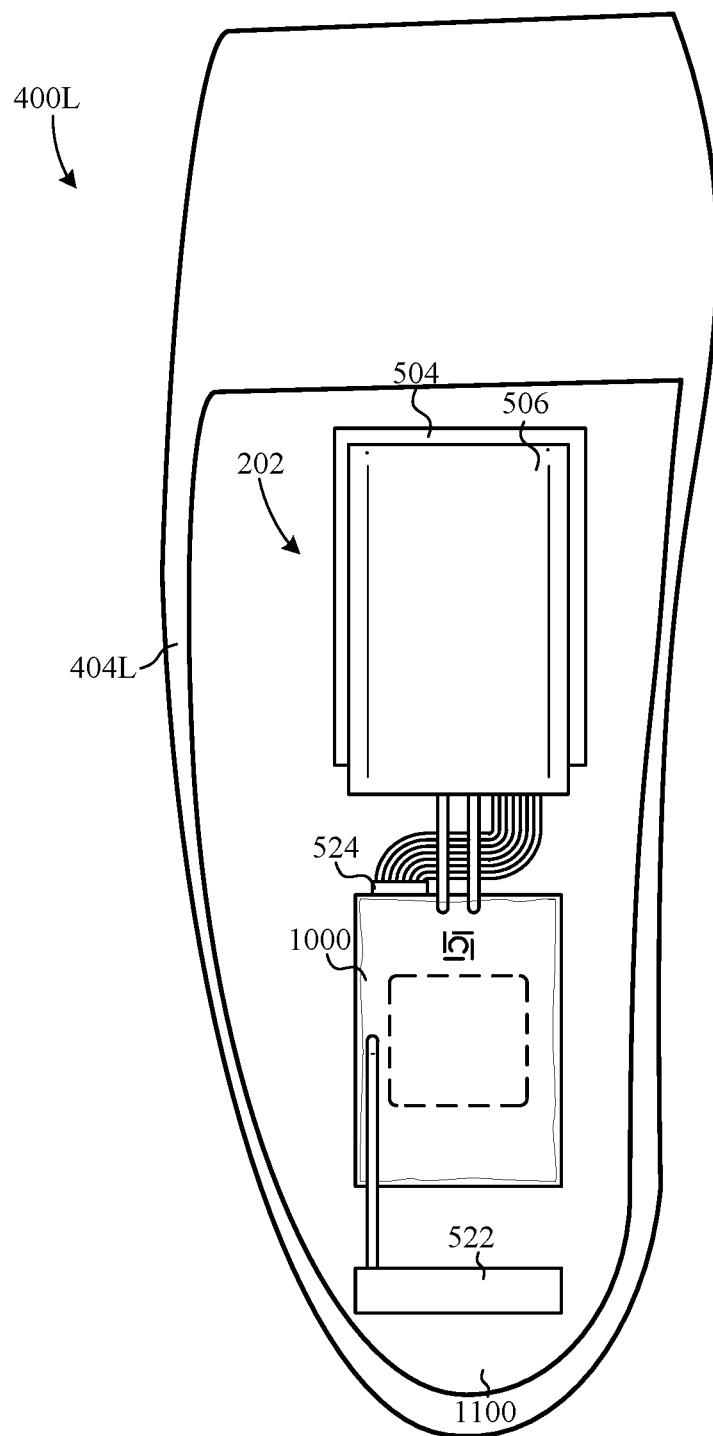
FIG. 11 is a top view of the tracking device of FIG. 10 disposed in an insole.

FIG. 11 shows the relative position of LRTD 202 within insole 400L. In this view, the material of body 404L is shown transparent so that the positioning of LRTD 202 within body 404L is visible. Insole 400L further includes a heal pad 1100 disposed on the bottom surface of body 404L and under LRTD 202. As shown, antenna 512 and 522, and charging system 506 are positioned just under the top surface of insole 400L.

Figure 12A:
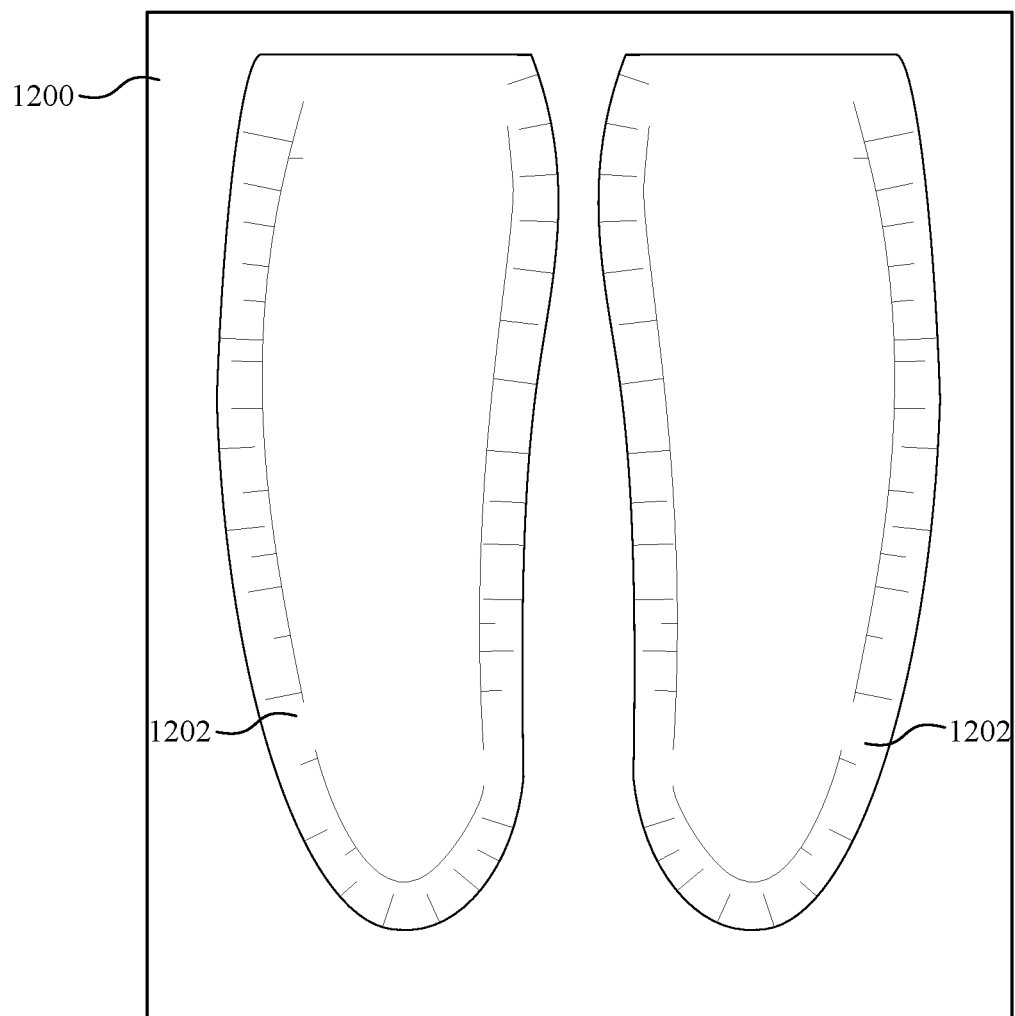
FIG. 12A depicts a first step of manufacturing the insole of FIG. 8.
Figure 12B:
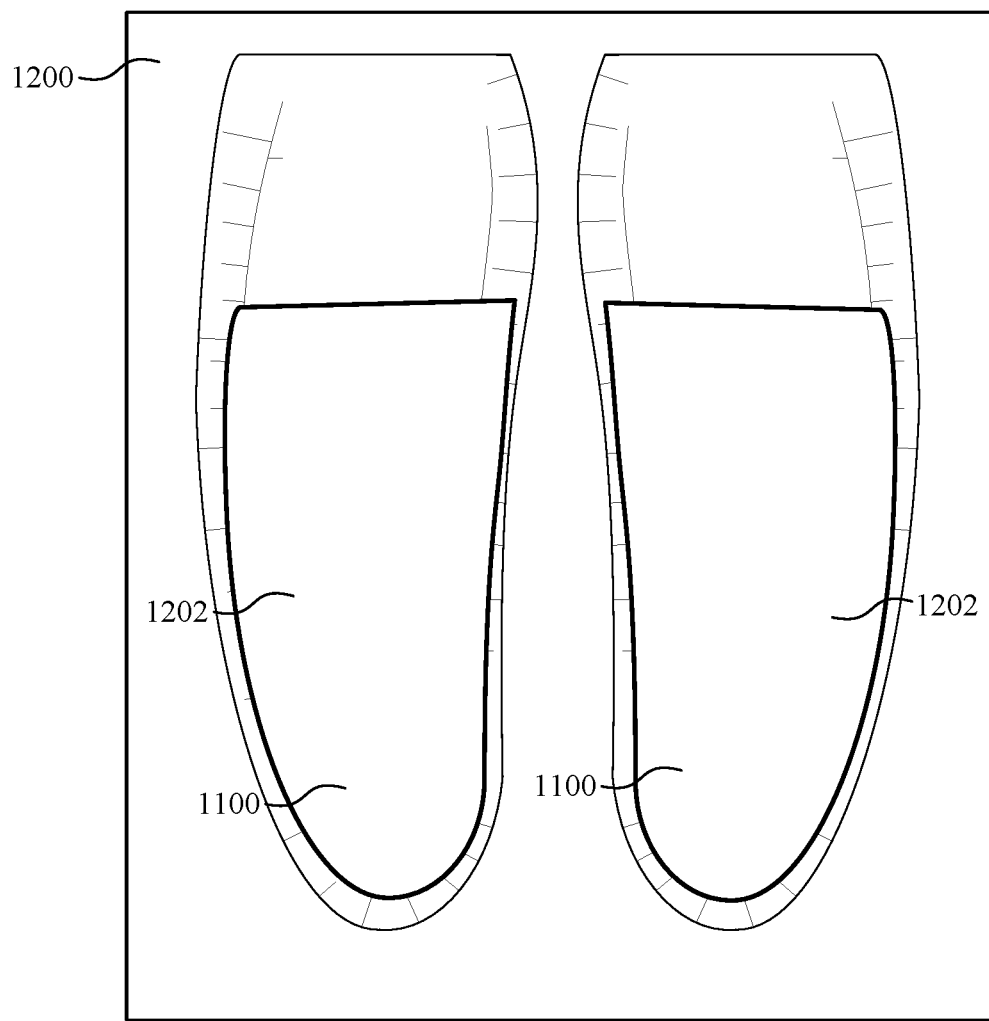
FIG. 12B depicts a second step of manufacturing the insole of FIG. 8.

FIGS. 12A through 12D illustrate one method for manufacturing insoles 400L and 400R. In a first step, as depicted in FIG. 12A, an insole mold 1200 is provided. Mold 1200 includes a pair (left and right) of insole shaped cavities 1202. In a second step, as depicted in FIG. 12B, a set of heal pads 1100 are positioned at the heal region of cavities 1202. Heal pads 1100 keep LRTD 202 and SRTD 200 up off of the bottom of cavities 1202 and ensures that LRTD 202 and SRTD 200 are fully encapsulated in insole bodies 400L and 400R, respectively. Optionally, mold 1200 can include a set of bumps on the bottom surface of each cavity 1202 to facilitate polyurethane flow under LRTD 202 and SRTD 200.

Figure 12C:
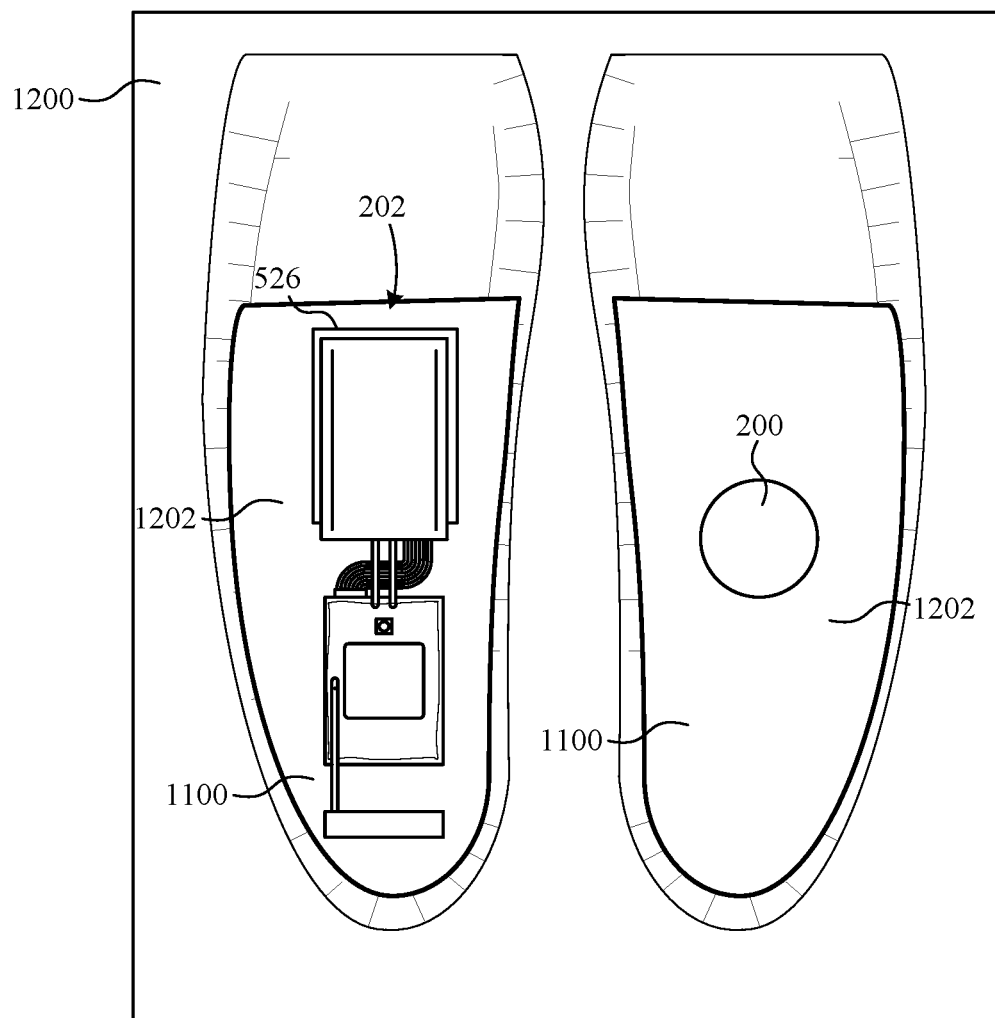
FIG. 12C depicts a third step of manufacturing the insole of FIG. 8.
Figure 12D:
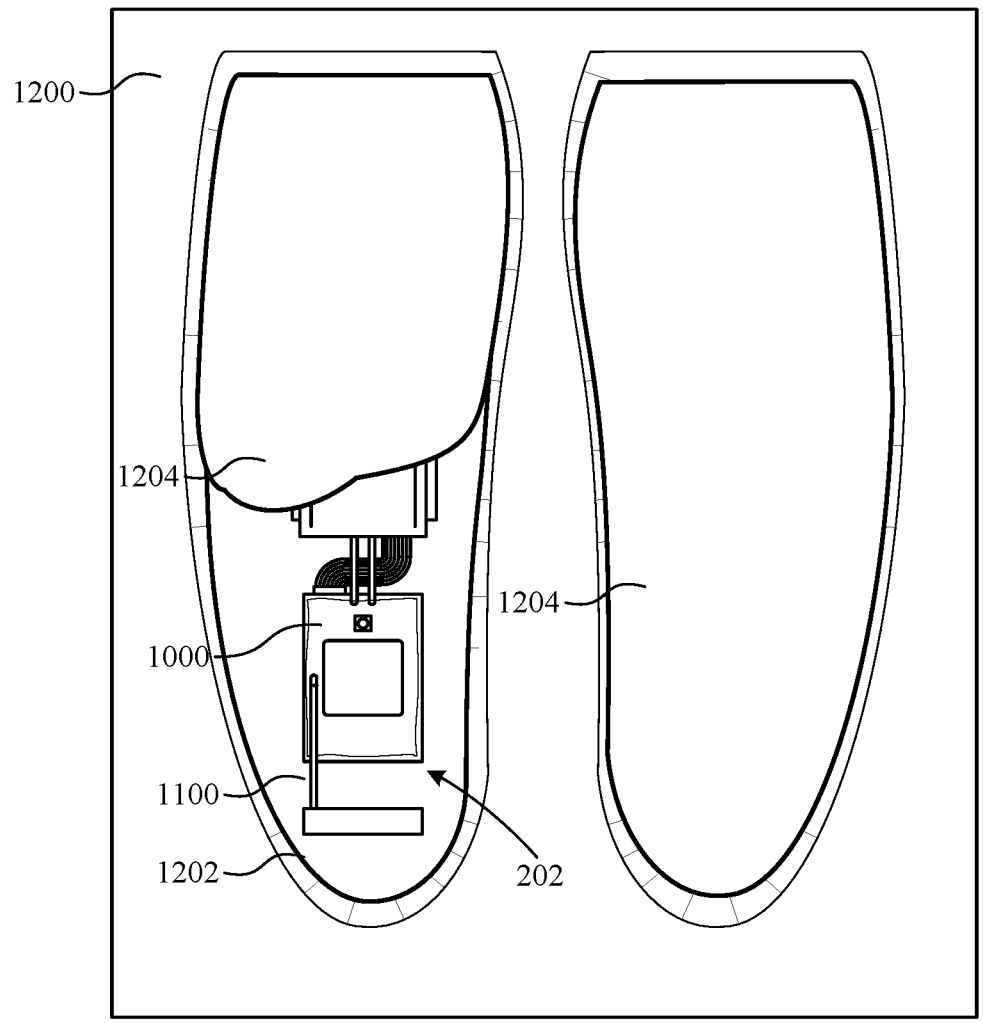
FIG. 12D depicts a fourth step of manufacturing the insole of FIG. 8.
Figure 12E:
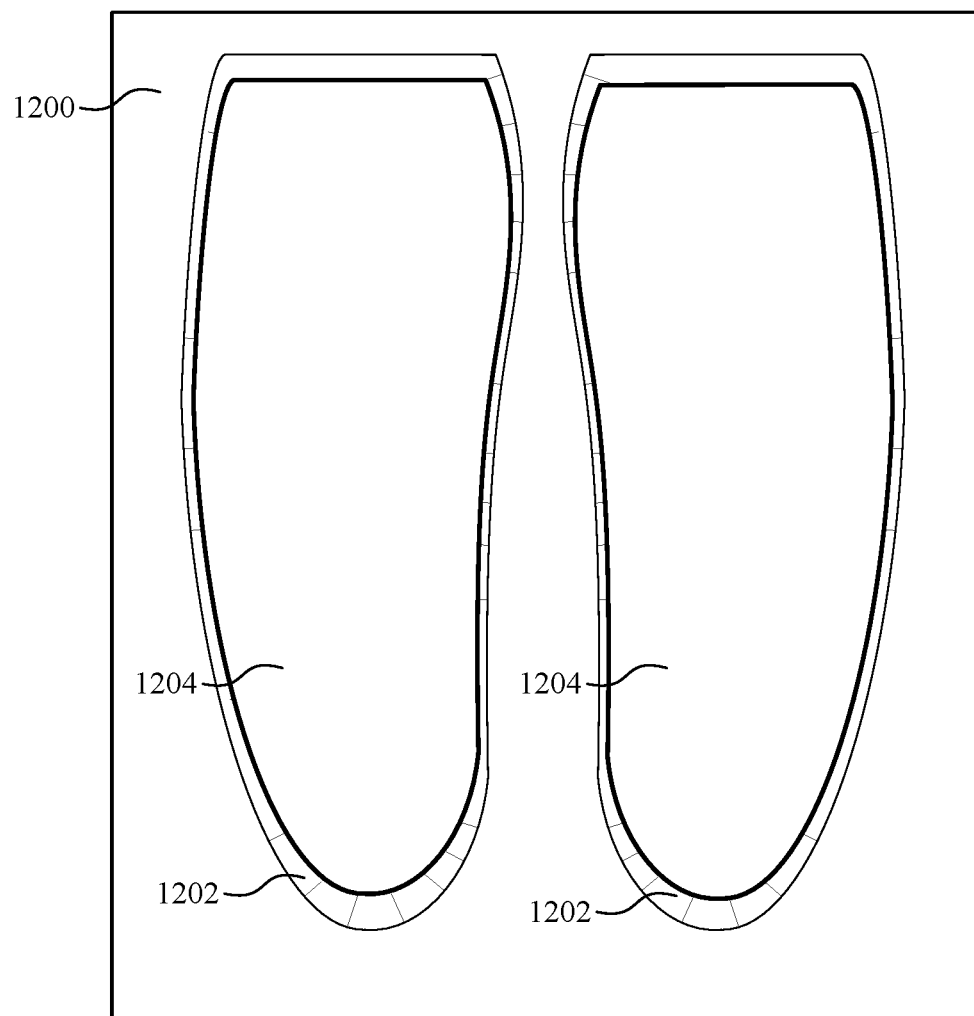
FIG. 12E depicts a fifth step of manufacturing the insole of FIG. 8.

In a third step, as depicted in FIG. 12C, plate 526 and LRTD 202 are positioned in the left one of cavities 1202, and SRTD 200 is positioned in the right one of cavities 1202. Then, in a fourth step, as depicted in FIG. 12D, uncured polyurethane 1204 is poured into cavities 1202, thereby submerging LRTD 202, SRTD 200, plate 526, and heal pads 1100. Once cavities 1202 are filled with polyurethane 1204, polyurethane 1204 is then cured to form bodies 404. Finally, insoles 400L and 400R are removed from cavities 1202. Although the manufacturing process is described using an open top mold, a closed mold can be used to provide contour to the upper surfaces of insole bodies 404.

Figure 13:
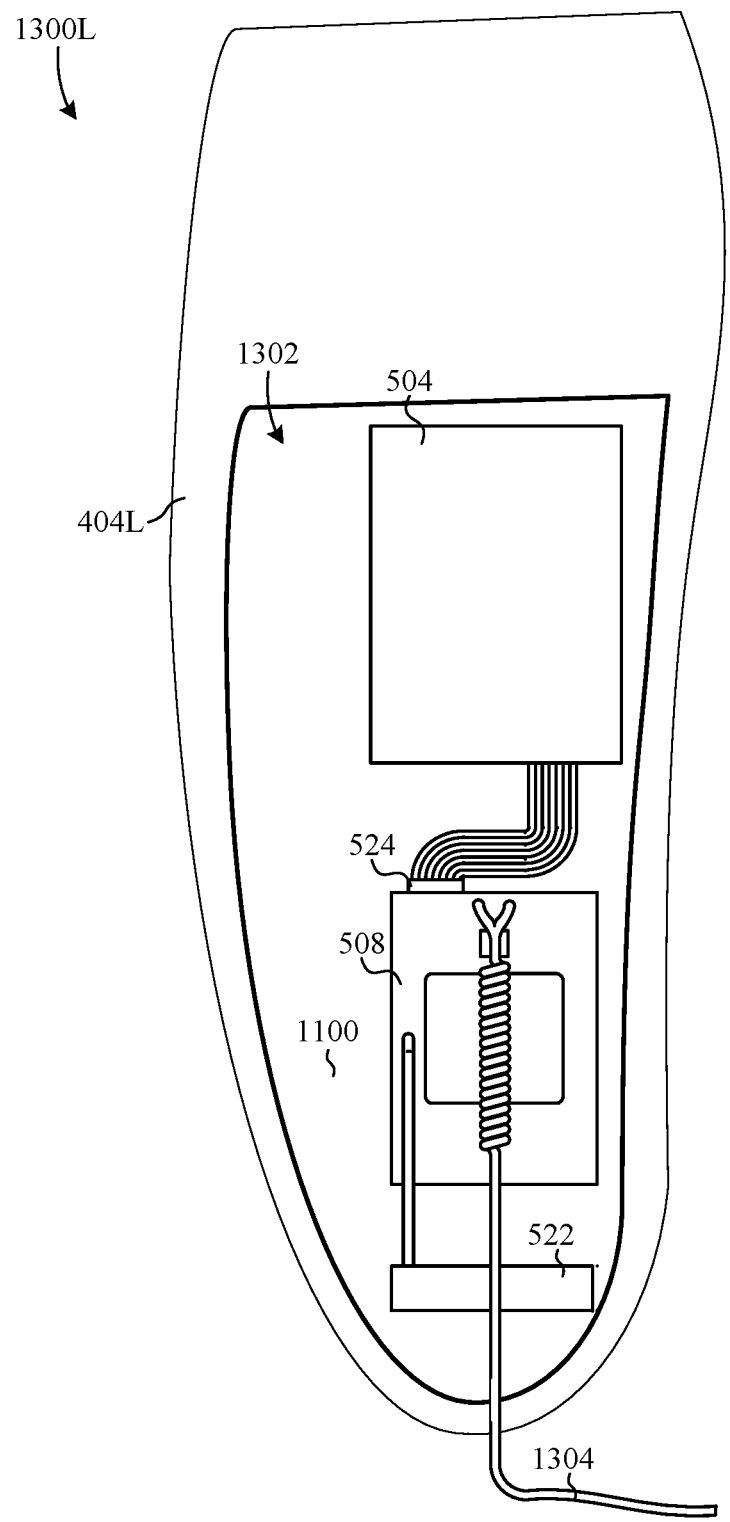
FIG. 13 is a top view of an insole according to another embodiment of the present invention.

FIG. 13 shows a top view of an insole 1300L according to another embodiment of the present invention. Several components are substantially similar or identical to components of insole 400L. Therefore, those components are denoted by like numbers and their descriptions are omitted to avoid redundancy.

Insole 1300L includes a body 404L and a LRTD 1302. LRTD 1302 is substantially similar to LRTD 1302, except that the inductive charging pad of charging system 506 is replaced by a set of battery charging wires 1304 that extend out of body 404L. As shown, wires 1304 are coiled within body 404L to reduce stress applied to wires 1304 and PCB 508 as the wearer of insole 1300L walks. As the wearer takes a step, coiled wires 1304 flex like a spring. As previously mentioned, body 404L is shown transparent to show details of tracking LRTD 1302 that would otherwise not be visible.

Figure 14:
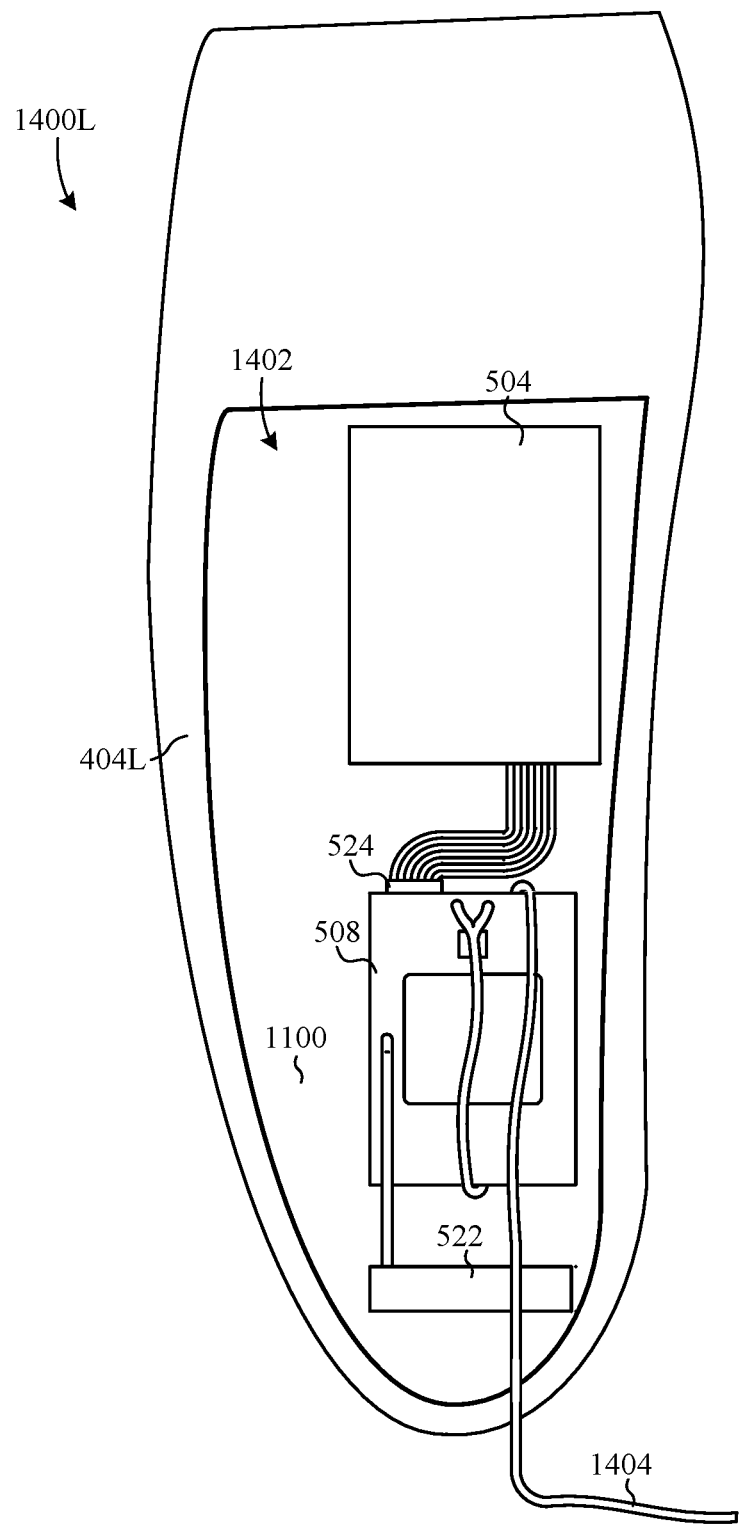
FIG. 14 is a top view of an insole according to another embodiment of the present invention.

FIG. 14 shows a top view of an insole 1400L according to another embodiment of the present invention. Insole 1400L includes a body 404L and a LRTD 1402. LRTD 1402 is substantially similar to LRTD 1302 except that battery charging wires 1304 are replaced by a set of wires 1404 that extend out of body 404L, but are arranged differently. As shown, wires 1404 are wrapped around PCB 508 to reduce stress applied to wires 1404 and PCB 508 as the wearer of insole 1400 walks. As the user takes a step, wires 1404 pull slightly against PCB 508 rather than against the solder joints where wires 1404 are attached to PCB 508. Again, body 404L is shown transparent so that the details of LRTD 1502 are visible.

Figure 15:
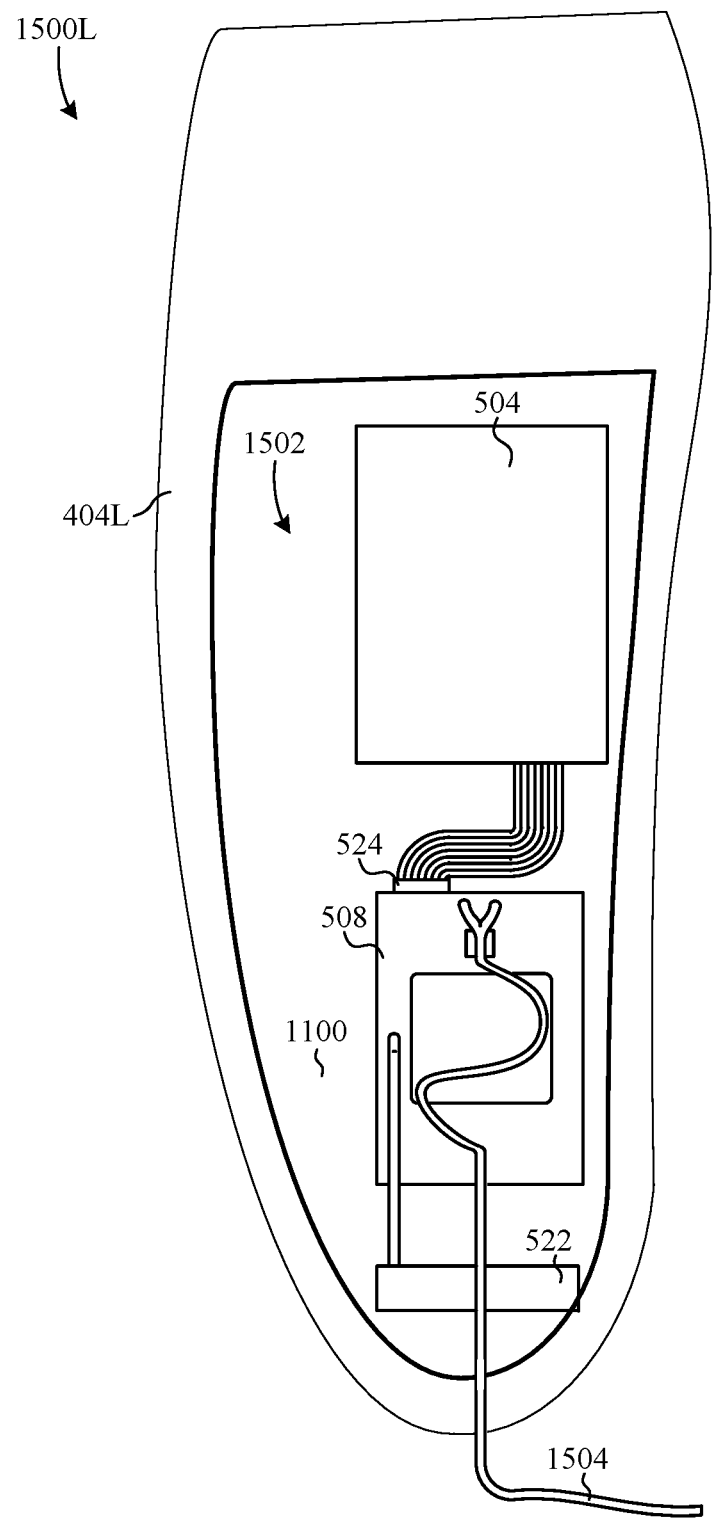
FIG. 15 is a top view of an insole according to another embodiment of the present invention.

FIG. 15 shows a top view of an insole 1500L according to another embodiment of the present invention. Insole 1500 includes a body 404L and a LRTD 1502. LRTD 1502 is substantially similar to LRTD 1302 except that battery charging wires 1304 are replaced by a set of wires 1504 that extend out of body 404L, but are arranged differently. As shown, wires 1504 are bent into a zig-zag pattern across PCB 508, which reduces stress applied to wires 1504 and PCB 508 as the wearer of insole 1500 walks. As the user takes a step, wires 1504 flex like a spring. Again, body 404L is shown transparent so that the details of LRTD 1502 are visible.

Figure 16:
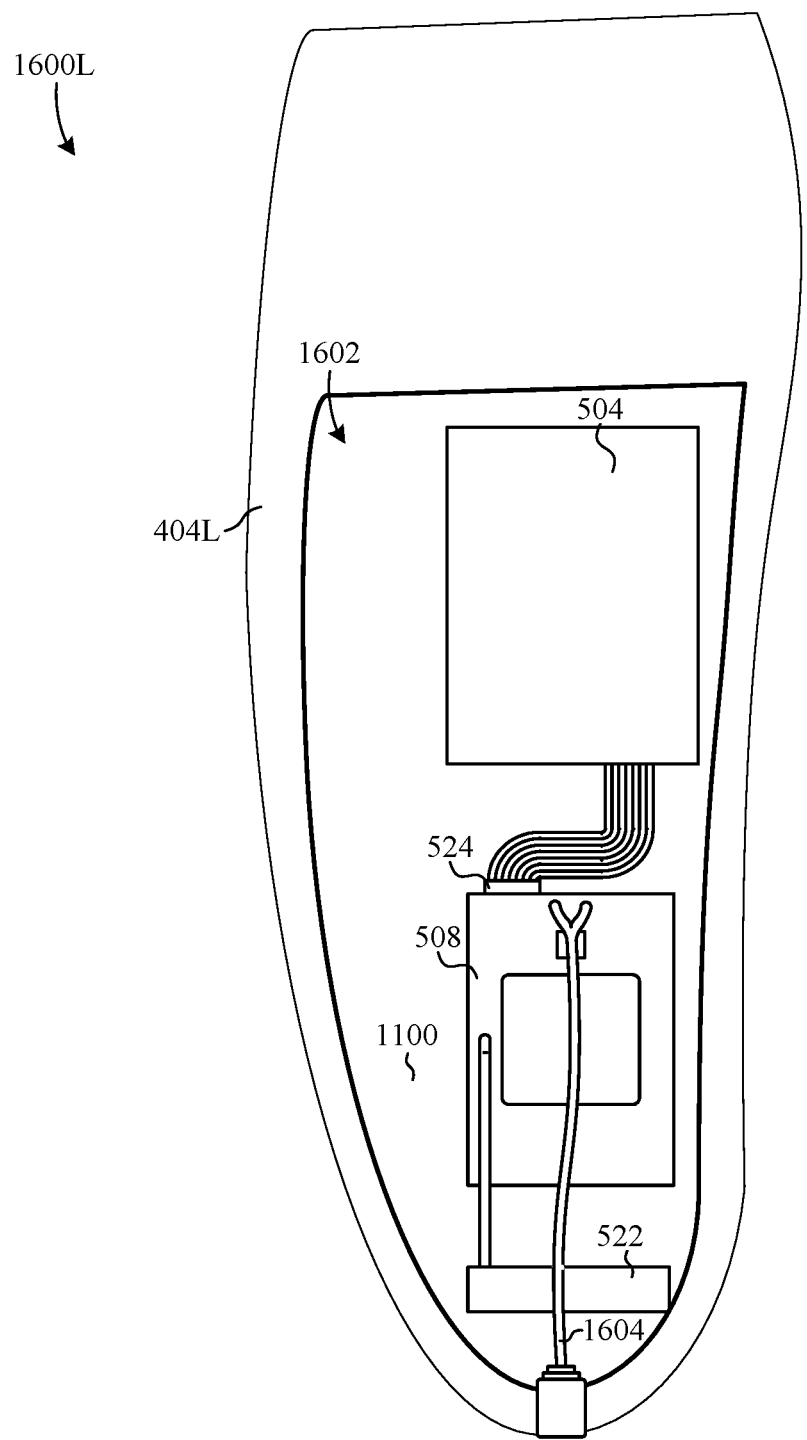
FIG. 16 is a top view of an insole according to another embodiment of the present invention.

FIG. 16 shows a top view of an insole 1600L according to yet another embodiment of the present invention. Insole 1600L includes a body 404L and a LRTD 1602. LRTD 1602 is substantially similar to LRTD 402 except that the inductive charging pad of charging system 506 is replaced by a mini USB cable 1604 that is accessible from the exterior of body 404L. Again, body 404L is shown transparent so that the details of LRTD 1502 are visible.

Figure 17:
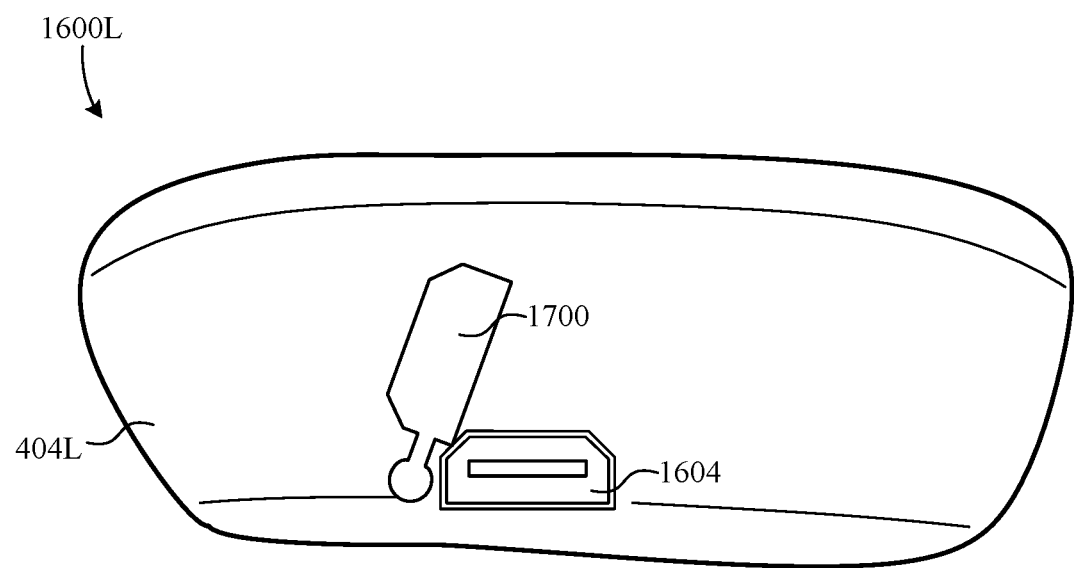
FIG. 17 is a rear view of the insole of FIG. 16.

FIG. 17 shows a rear view of insole 1600L wherein mini USB cable 1604 is accessible through body 404L. During use, the socket of USB cable 1604 is protected from debris and moisture by a resilient plug 1700, which can be removed to permit charging via a USB charger.

Figure 18:
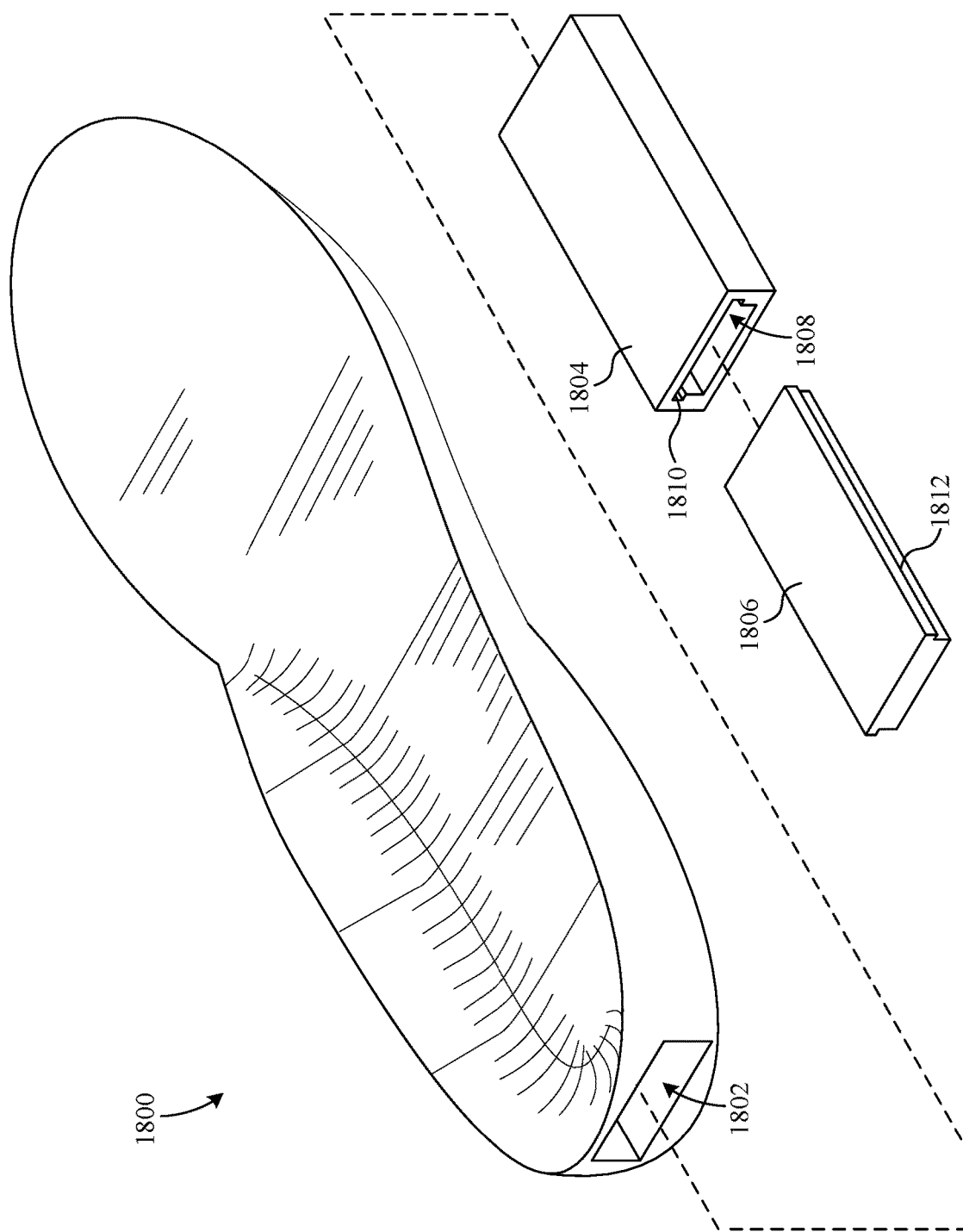
FIG. 18 is a perspective view of an electronic device receiving insole.

FIG. 18 shows a perspective view of an insole 1800 according to another embodiment of the present invention. Insole 1800 includes an opening 1802, an electronic device receptacle 1804, and an electronic device 1806. Opening 1802 receives electronic device receptacle 1804, which includes an opening 1808 configured to receive a variety of electronic devices (i.e. electronic device 1806) designed with a complementary configuration. As shown, opening 1808 includes a set of channels 1810 that receive a complimentary set of lips 1812 of electronic device 1806. Channels 1810 and lips 1812, together, prevent electronic device 1806 from being inserted into opening 1808 improperly. Although not shown in the view of FIG. 18, receptacle 1804 includes means for retaining and selectively releasing (e.g., one or more detents, clips, frictional fit, etc.) device 1806 from receptacle 1804.

In the example embodiment, electronic device 1806 is a LRTD that includes substantially identical components and functionality as LRTD 202. It should be understood, however, that electronic device 1806 need not necessarily be limited to tracking systems. Electronic device 1806 can be any type of device that would be advantageous to carry in a footwear insole. Examples of such devices include, but are not limited to, a pedometer, a scale, health monitors (e.g., pulse sensor, temperature sensor, etc.), personal area network devices, and so on. Indeed, receptacle 1804 can receive, retain, and selectively release any device with a complementary configuration, whether electronic or not.

The complementary receiver/device design provides several important advantages. For example, the design allows users to swap out different devices for different circumstances, without the need to replace the footwear or the insole. Another important advantage is that incorporating the receiver into the insole instead of the device isolates the device from whatever manufacturing process is necessary to incorporate the receiver into the insole.

Figure 19A:
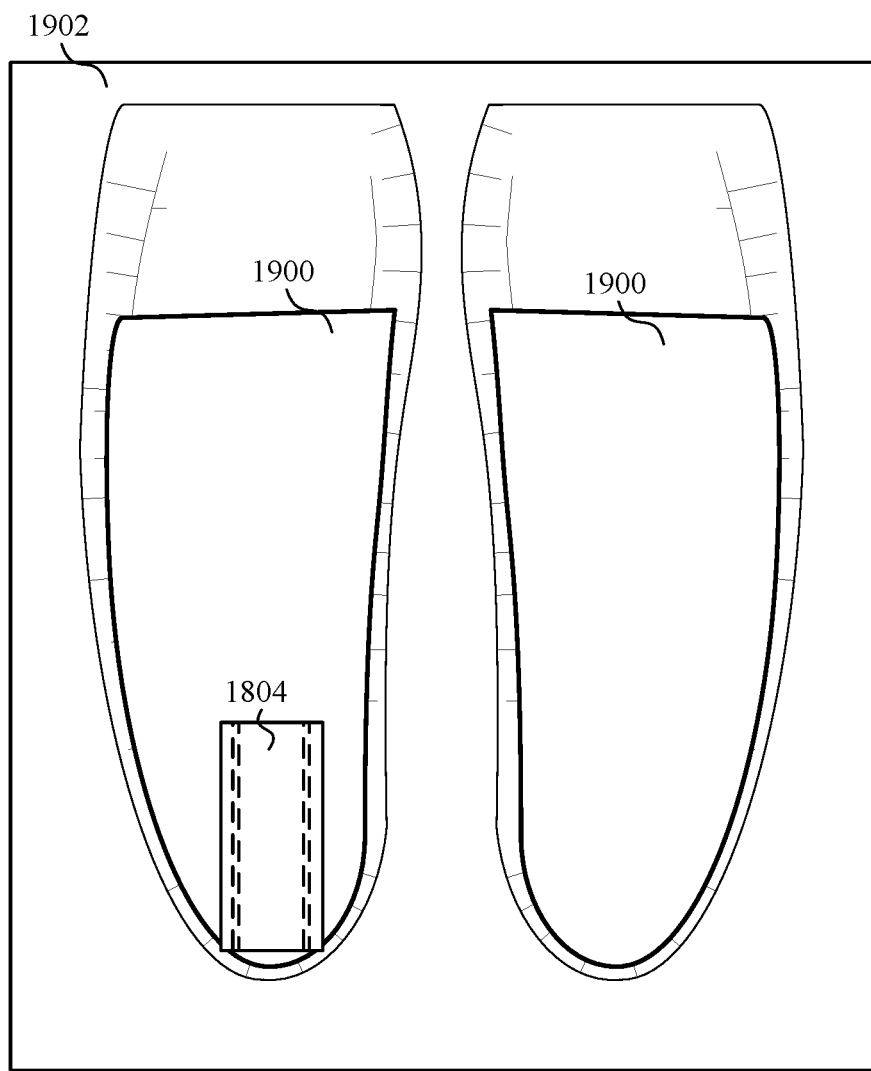
FIG. 19A depicts a first step of manufacturing the insole of FIG. 18.
Figure 19B:
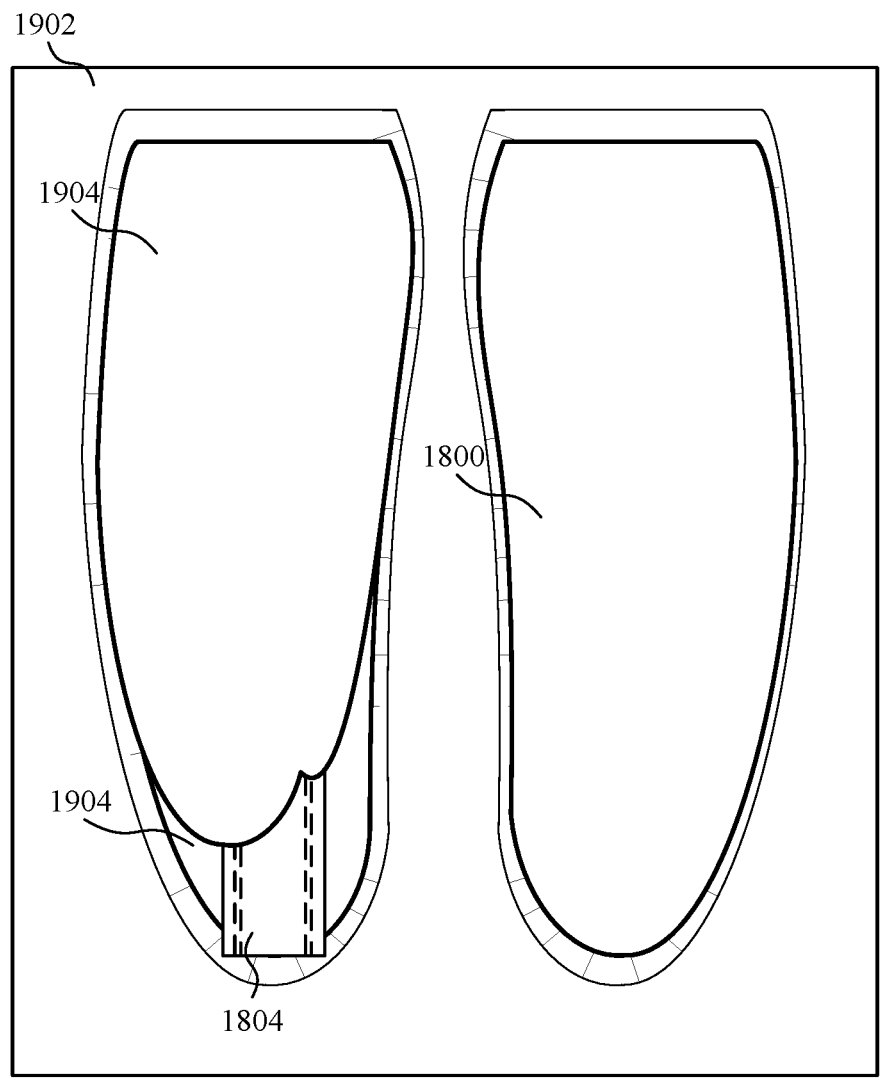
FIG. 19B depicts a second step of manufacturing the insole of FIG. 18.
Figure 19C:
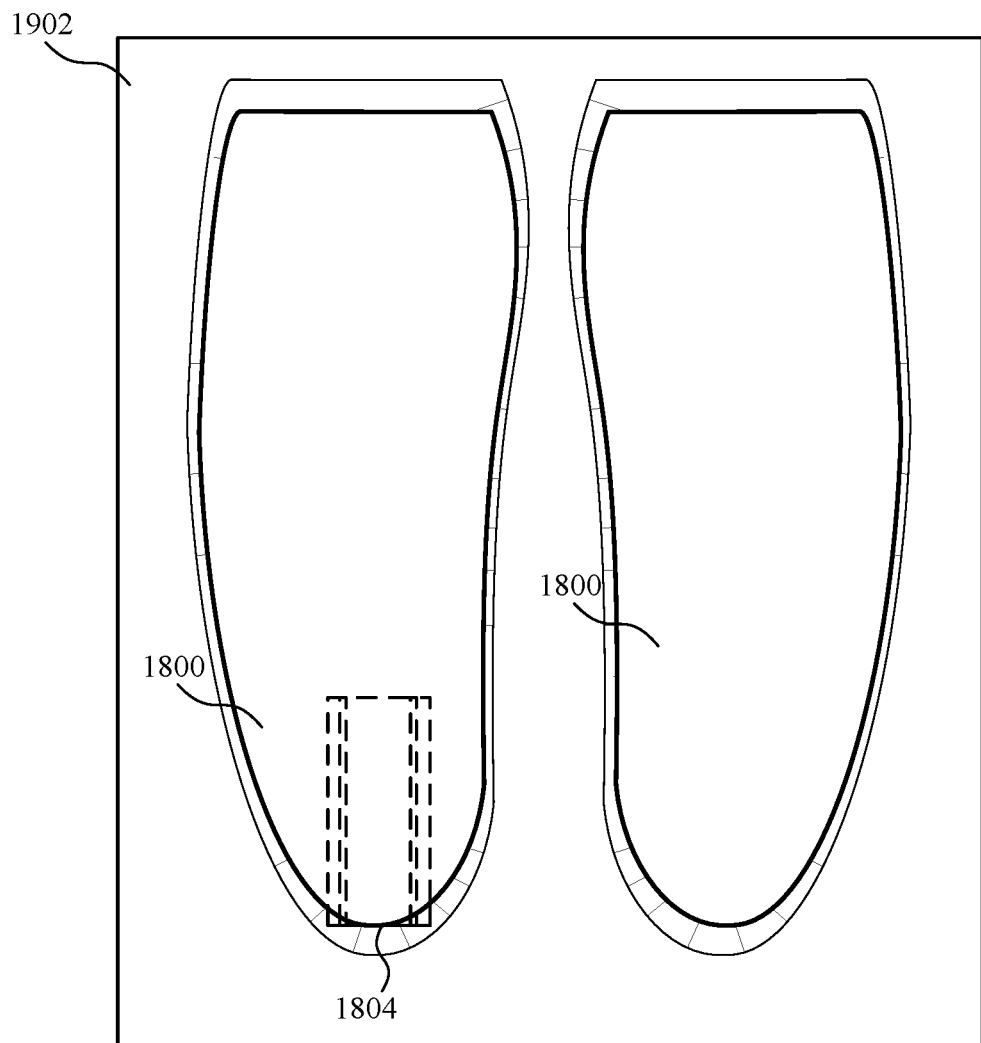
FIG. 19C depicts a third step of manufacturing the insole of FIG. 18.

FIGS. 19A through 19C illustrate an alternate method of manufacturing insole 1800. In a first step, as depicted in FIG. 19A, a set of heal pads 1900 and an electronic device receptacle 1804 are positioned in an insole mold 1902. Then in a second step, as depicted in FIG. 19B, polyurethane 1904 is poured into the cavities of mold 1902, over heal pads 1900 and electronic device receptacle 1804. Finally, in a third step, as depicted in FIG. 19C, polyurethane 1904 is cured and insoles 1800 are removed from mold 1902.

Figure 20:
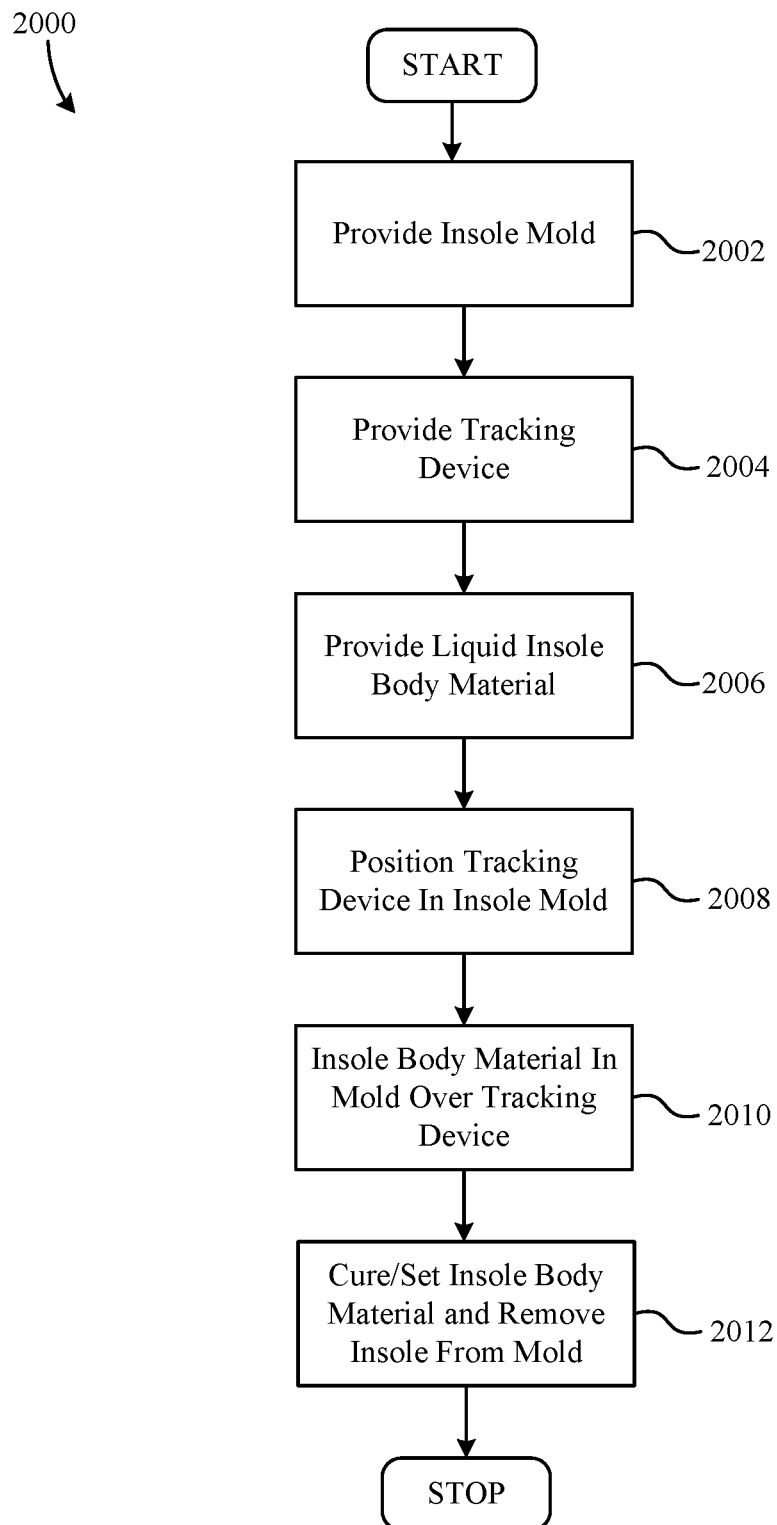
FIG. 20 is a flowchart summarizing one method for manufacturing a footwear insole with an embedded tracking device.

FIG. 20 is a flow chart summarizing an example method 2000 for manufacturing a footwear insole. In a first step 2002, an insole mold is provided. Then, in a second step 2004, a tracking device is provided. Next, in a third step 2006, an insole body material is provided. Then, in a fourth step 2008, the tracking device is positioned in the insole mold. Next, in a fifth step 2010, the insole body material is introduced (poured, injected, etc.) into the mold over the tracking device. Finally, in a sixth step 2012, the insole body material is cured/set, and the completed insole is removed from the mold.

Figure 21:
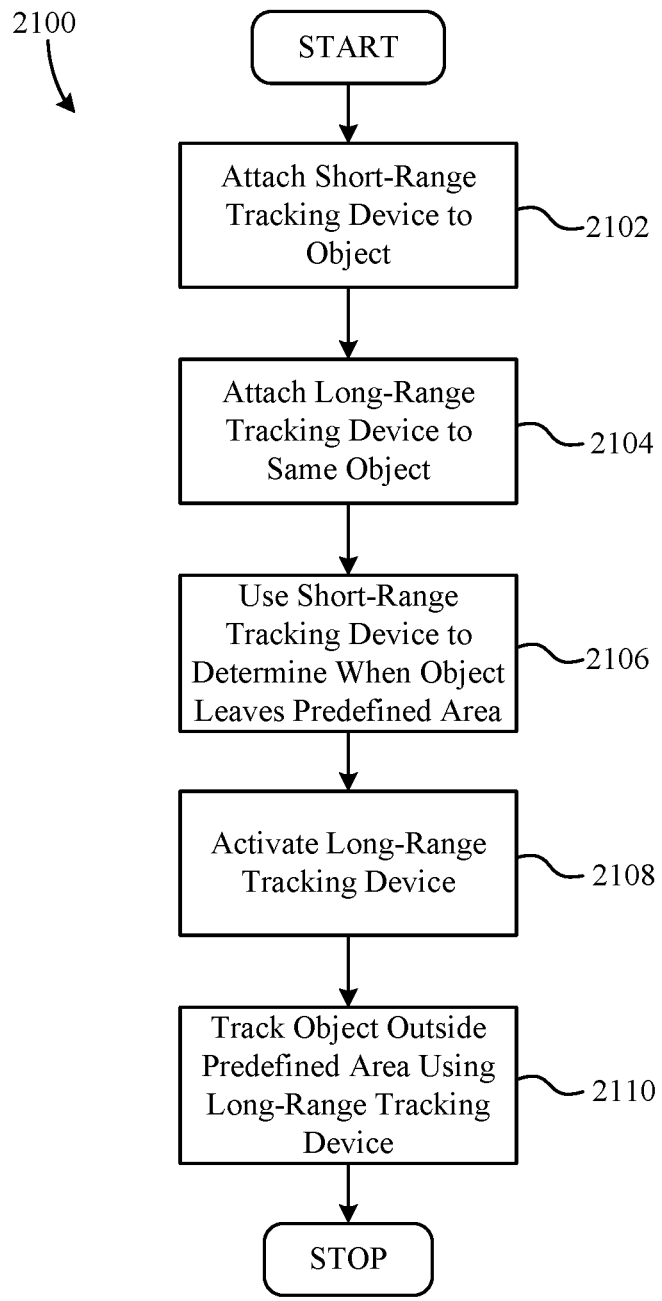
FIG. 21 is a flowchart summarizing one method for tracking an object.

FIG. 21 is a flow chart summarizing an example method 2100 of tracking an object. In a first step 2102, a short-range tracking device is attached to an object and, in a second step 2104, a long-range tracking device is attached to the same object. Then, in a third step 2106, the short-range tracking device is used to determine when the object leaves a predetermined area. Next, in a fourth step 2108, the long-range tracking device is activated. Then, in a fifth step 2110, the object is tracked using the long-range tracking device.

The description of particular embodiments of the present invention is now complete. Many of the described features may be substituted, altered or omitted without departing from the scope of the invention. For example, LRTD systems (e.g., cellular triangulation), may be substituted for the GPS LRTD. As another example, the polyurethane used to form the insole body can be substituted with various other materials suitable for manufacturing insoles. These and other deviations from the particular embodiments shown will be apparent to those skilled in the art, particularly in view of the foregoing disclosure.

We claim:

1. A removable footwear insole comprising:
  an insole body configured for removable insertion into footwear and configured to
    engage the plantar region of a foot of a wearer;
  a tracking device including
    a battery, the battery being disposed on a first side of a plane passing through the insole body, and
    an inductive charging unit, the inductive charging unit being completely embedded within the insole body and being disposed on a second, opposite side of the plane passing through the insole body.

2. The removable footwear insole of claim 1, further comprising a protective structure disposed at least partially within the insole body and adjacent at least a portion of the tracking device, and wherein the protective structure is a fireproof enclosure at least partially enclosing the tracking device.

3. The removable footwear insole of claim 1, further comprising a protective structure disposed at least partially within the insole body and adjacent at least a portion of the tracking device, and wherein the protective structure is an antistatic bag at least partially enclosing the tracking device.

4. The removable footwear insole of claim 1, further comprising a protective structure disposed at least partially within the insole body and adjacent at least a portion of the tracking device, and wherein the protective structure is a layer of epoxy at least partially enclosing the tracking device.

5. The removable footwear insole of claim 1, further comprising a protective structure disposed at least partially within the insole body and adjacent at least a portion of the tracking device, and wherein the protective structure is a rigid enclosure at least partially enclosing the tracking device and configured to protect the tracking device from mechanical damage.

6. The removable footwear insole of claim 5, wherein the rigid enclosure fully encloses the tracking device and is sealed to protect the tracking device from moisture.

7. The removable footwear insole of claim 1, further comprising a protective structure disposed at least partially within the insole body and adjacent at least a portion of the tracking device, and wherein
  the protective structure is disposed adjacent the battery.

8. The removable footwear insole of claim 1, further comprising a protective structure disposed at least partially within the insole body and adjacent at least a portion of the tracking device, and wherein the protective structure is configured to protect the tracking device while the insole body is being manufactured.

9. The removable footwear insole of claim 1, further comprising a protective structure disposed at least partially within the insole body and adjacent at least a portion of the tracking device, and wherein the protective structure is configured to protect the tracking device while the insole body is inside the shoe of a user.

10. A removable footwear insole comprising:
  an insole body configured for removable insertion into footwear and configured to engage the plantar region of a foot of a wearer;
  a location determining device;
  a wireless communication device;
  a battery configured to power the location determining device and the wireless communication device; and
  an inductive charging device, the inductive charging device being electrically coupled to the battery, having a generally planar structure, and being disposed proximate the battery within the insole body; and wherein
  at least one element of the location determining device, the wireless communication device, or the battery is mounted on a first side of a circuit substrate;
  at least one other element of the location determining device, the wireless communication device, or the battery is mounted on a second side of the circuit substrate opposite the first side; and
  the location determining device, the wireless communication device, the battery, and the circuit substrate together form a tracking device, the tracking device disposed at least partially within the insole body.

11. The removable footwear insole of claim 10, wherein:
  the location determining device is a global positioning system (GPS) receiver including a GPS module and a GPS antenna;
  the GPS module is mounted on the first side of the circuit substrate; and
  the GPS antenna is mounted on the second side of the circuit substrate.

12. The removable footwear insole of claim 10, wherein:
  the wireless communication device is a wireless cellular modem including a subscriber identity module (SIM) card, a microprocessor, and a communications antenna;
  the SIM card and the microprocessor are mounted on the first side of the circuit substrate; and
  the communications antenna is mounted on the second side of the circuit substrate.

13. The removable footwear insole of claim 10, wherein:
  the wireless communication device is a wireless cellular modem including a subscriber identity module (SIM) card, a microprocessor, and a communications antenna;
  the SIM card and the communications antenna are mounted on the first side of the circuit substrate; and
  the microprocessor is mounted on the second side of the circuit substrate.

14. The removable footwear insole of claim 10, wherein:
the wireless communication device is a wireless cellular modem including a subscriber identity module (SIM) card, a microprocessor, and a communications antenna;
the communications antenna and the microprocessor are mounted on the first side of the circuit substrate; and
the SIM card is mounted on the second side of the circuit substrate.

15. The removable footwear insole of claim 10, wherein:
the inductive charging circuit is coupled the first side of the circuit substrate; and
the battery is coupled the second side of the circuit substrate.

16. The removable footwear insole of claim 15, wherein the inductive charging circuit and the battery are coupled to the circuit substrate via wires electrically connected between the inductive charging circuit and the circuit substrate and between the battery and the circuit substrate.

17. The removable footwear insole of claim 15, wherein the inductive charging circuit and the battery are coupled to the circuit substrate via wired modular connectors.

18. The removable footwear insole of claim 10, wherein the circuit substrate is a printed circuit board (PCB).

19. The removable footwear insole of claim 10, wherein the circuit substrate is a flexible circuit substrate.

20. The removable footwear insole of claim 10, wherein the battery is a flexible lithium ceramic battery.

* * * * *